United States Patent

Kano et al.

[11] Patent Number: 5,867,596
[45] Date of Patent: Feb. 2, 1999

[54] METHOD FOR DIAGRAM RECOGNITION BY USING RECOGNIZING RULES AND SYSTEM FOR IMPLEMENTING THE METHOD

[75] Inventors: Shigeru Kano; Yasuhiro Nakada; Yutaka Usuda, all of Yokohama, Japan

[73] Assignee: Hitachi Software Engineering Co., Ltd., Kanagawa-ken, Japan

[21] Appl. No.: 380,445

[22] Filed: Jan. 30, 1995

Related U.S. Application Data

[63] Continuation of Ser. No. 975,684, Nov. 13, 1992, abandoned.

[30] Foreign Application Priority Data

Nov. 14, 1991 [JP] Japan .................................. 3-299232

[51] Int. Cl.⁶ .................................................. G06F 17/50
[52] U.S. Cl. ............................................................ 382/203
[58] Field of Search ............................ 395/700; 382/159, 382/203, 113

[56] References Cited

U.S. PATENT DOCUMENTS

| | | | |
|---|---|---|---|
| 4,388,610 | 6/1983 | Tsunekawa | 382/113 |
| 4,491,960 | 1/1985 | Brown | 382/26 |
| 4,821,336 | 4/1989 | Roye | 382/56 |
| 4,907,285 | 3/1990 | Nakano et al. | 382/48 |
| 4,933,865 | 6/1990 | Yamamoto et al. | 364/518 |
| 4,949,388 | 8/1990 | Bhaskaran | 382/10 |
| 4,969,202 | 11/1990 | Groezinger | 382/22 |
| 5,075,847 | 12/1991 | Fromme | 395/705 |
| 5,115,477 | 5/1992 | Groezinger | 382/22 |
| 5,148,522 | 9/1992 | Okazaki | 395/358 |
| 5,185,821 | 2/1993 | Yoda | 382/61 |
| 5,212,792 | 5/1993 | Gerety et al. | 395/701 |
| 5,216,724 | 6/1993 | Suzuki et al. | 382/7 |
| 5,247,137 | 9/1993 | Epperson | 178/18 |
| 5,251,268 | 10/1993 | Colley et al. | 382/14 |
| 5,295,222 | 3/1994 | Wadhwa et al. | 395/1 |
| 5,301,270 | 4/1994 | Steinberg et al. | 395/161 |
| 5,386,508 | 1/1995 | Itonori et al. | 395/701 |
| 5,410,613 | 4/1995 | Suzuki | 382/14 |
| 5,467,411 | 11/1995 | Tanaka et al. | 382/113 |

FOREIGN PATENT DOCUMENTS

| | | |
|---|---|---|
| 279158 | 8/1988 | European Pat. Off. . |
| 2-71366 | 3/1990 | Japan . |

OTHER PUBLICATIONS

S. Ito, "Automatic Input of Flow Chart in Document Image", IEEE Proceedings of the 6th International Conference on Software Engineering, IEEE Cat. No. 82CH1795–4, Sep. 16, 1982, pp. 319–328. .

(List continued on next page.)

*Primary Examiner*—Alvin E. Oberley
*Assistant Examiner*—St. John Courtenay, III
*Attorney, Agent, or Firm*—Fay, Sharpe, Beall, Fagan, Minnich & McKee

[57] ABSTRACT

A diagram recognizing system is capable of automatically recognizing a diagram prepared, for example, through a manual operation or through drawing software, independently from a CASE tool or the like, and delivering a recognized logic to the CASE tool or the like without the aid of any manual operation. A recognizing rule for recognizing the diagram as the object of recognition is entered and stored. A symbol, a connecting line, a character string, and a relationship of connection between the symbols, each structuring the diagram, are recognized on the basis of the recognizing rule by a diagram recognizing means. Logical data, indicative of the kind of each of the symbols, the character string, and the relationship of connection between the symbols, are generated, and the logical data are converted into and generated as a predetermined file type so as to be delivered directly to the CASE tool or the like.

1 Claim, 25 Drawing Sheets

RELATIONSHIP RECOGNIZING RULE 1020a

| KIND OF INPUT SYMBOL | KIND OF OUTPUT SYMBOL 1022a | | 1024a |
|---|---|---|---|
| 1021a | EXTERNAL AGENT | PROCESS | FILE |
| EXTERNAL AGENT | UNCONNECTABLE | SINGLE-DIRECTED FLOW OR DOUBLE-DIRECTED FLOW | UNCONNECTABLE |
| PROCESS | SINGLE-DIRECTED FLOW OR DOUBLE-DIRECTED FLOW | SINGLE-DIRECTED FLOW OR DOUBLE-DIRECTED FLOW | SINGLE-DIRECTED FLOW OR DOUBLE-DIRECTED FLOW |
| FILE | UNCONNECTABLE | SINGLE-DIRECTED FLOW OR DOUBLE-DIRECTED FLOW | UNCONNECTABLE |

OTHER PUBLICATIONS

H. Murase et al, "Online Hand–Sketched Figure Recognition", Pattern Recognition, vol. 19, No. 2, 1986, pp. 147–160

R. Kasturi et al, "A System for Interpretation of Line Drawings", IEEE Transactions on Pattern Analysis and Machine Intelligence, vol. 12, No. 10, Oct. 1990, pp. 978–992.

A. Okazaki et al, "Knowledge–Controlled Pattern Recognition Technique for Hand–Drawn Logic Symbols", IEEE Proceedings of the Workshop on Computer Architecture for Pattern Analysis and Image Database Management, IEEE Cat. No. 85CH2229–3, Nov. 20, 1985, pp. 524–531.

H. Kato et al, "The Recognition Method for Roughly Hand–Drawn Logical Diagrams Based on Hybrid Utilization of Multi–Layered Knowledge", IEEE Proceedings of the 10th International Conference on Pattern Recognition, vol. 1, Jun. 21, 1990, pp. 578–582.

Data Analyst of Buchman, Inc. (M. Sato; CASE Tool; Explanation of Its Functions and Know How of Its Application, page 219, Nov. 1, 1989.

M. Nakamura, Evolving CASE, Exploding "Walls" Among Steps & Providing Smooth Development Environments, Nikkei Computer, pp. 78–101, Nov. 5, 1990.

M. Tsuchiya; Jimu to Keiei: An Intelligent System for Recognizing Account Books & Vouchers as an Instant Power Potential; pp. 8–10, Sep. 1990.

FIG. 4

| NAME | KIND | RELATIONSHIP OF CONNECTION |
|---|---|---|
| USER | EXTERNAL AGENT | — |
| DATA OF ORDER | FLOW | USER → ORDER PROCESSING |
| SHIPMENT OF PRODUCT | FLOW | SHIPMENT PROCESSING → USER |
| ORDER PROCESSING | PROCESS | — |
| REQUEST FOR ASSEMBLY | FLOW | ORDER PROCESSING → ASSEMBLY OF PRODUCT |
| REQUEST OF USER | FLOW | ORDER PROCESSING → ORDER FILE |
| ASSEMBLY OF PRODUCT | PROCESS | — |
| SELECTION OF PARTS | FLOW | ASSEMBLY OF PRODUCT → DATA OF STOCK |
| DATA OF FINISHED PRODUCT | FLOW | ASSEMBLY OF PRODUCT → SHIPMENT PROCESSING |
| ORDER FILE | FILE | — |
| DATA OF SHIPMENT TO USER | FLOW | ORDER FILE → SHIPMENT PROCESSING |
| DATA OF STOCK | FILE | — |
| SHIPMENT PROCESSING | PROCESS | — |
| DATA OF SHIPMENT | FLOW | SHIPMENT PROCESSING → SHIPMENT FILE |
| SHIPMENT FILE | FILE | — |

701 DATA OF AN IMAGE

| 0 | 0 | 0 | 1 | 1 | 1 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|
| 0 | 0 | 0 | 1 | 1 | 1 | 1 | 0 | 0 | 0 | 0 | 0 | 0 | 0 | 0 | 0 | 0 | 0 | 0 |
| 0 | 0 | 0 | 0 | 1 | 1 | 1 | 0 | 0 | 0 | 1 | 1 | 1 | 0 | 0 | 0 | 0 | 0 | 0 |
| 0 | 0 | 0 | 0 | 0 | 1 | 1 | 1 | 1 | 0 | 0 | 1 | 1 | 1 | 0 | 0 | 0 | 0 | 0 |
| 0 | 0 | 0 | 0 | 0 | 0 | 1 | 1 | 1 | 1 | 0 | 1 | 1 | 0 | 0 | 0 | 0 | 0 | 0 |
| 0 | 0 | 0 | 0 | 0 | 0 | 0 | 1 | 1 | 1 | 1 | 1 | 1 | 0 | 0 | 0 | 0 | 0 | 0 |
| 0 | 0 | 0 | 0 | 0 | 1 | 1 | 0 | 1 | 1 | 1 | 1 | 0 | 0 | 0 | 0 | 0 | 1 | 1 |
| 0 | 0 | 0 | 0 | 0 | 1 | 1 | 1 | 1 | 1 | 1 | 1 | 0 | 0 | 0 | 0 | 1 | 1 | 1 |
| 0 | 0 | 0 | 0 | 0 | 0 | 1 | 1 | 1 | 1 | 1 | 1 | 0 | 0 | 1 | 1 | 1 | 1 | 1 |
| 0 | 0 | 0 | 0 | 0 | 0 | 0 | 0 | 0 | 0 | 0 | 0 | 1 | 1 | 1 | 0 | 0 | 0 | 0 |
| 0 | 0 | 0 | 0 | 0 | 0 | 0 | 0 | 0 | 0 | 1 | 1 | 1 | 1 | 0 | 0 | 0 | 0 | 0 |
| 0 | 0 | 0 | 0 | 0 | 0 | 0 | 0 | 0 | 0 | 1 | 1 | 1 | 0 | 0 | 0 | 0 | 0 | 0 |
| 0 | 0 | 0 | 0 | 0 | 0 | 0 | 0 | 0 | 1 | 1 | 1 | 0 | 0 | 0 | 0 | 0 | 0 | 0 |
| 0 | 0 | 0 | 0 | 0 | 0 | 0 | 0 | 0 | 1 | 1 | 1 | 1 | 0 | 0 | 0 | 0 | 0 | 0 |

FIG. 6(b)

GRAPHIC TABLE 802

| GRAPHIC ID 803 | CLASS 804 | STRUCTURING LINE SEGMENTS 805 | BRANCHED POINTS 806 |
|---|---|---|---|
| G1 | CLOSED GRAPHIC | L1 L2 L3 L4 L5 L6 L7 L8 L9 L10 L11 L12 | (x1, y1) ... |
| G2 | OPEN GRAPHIC | L13 L14 | (x1, y1) ... |
| G3 | OPEN GRAPHIC | L15 L16 | (x1, y1) ... |
| ... | | ... | ... |

FIG. 6(c)

LINE SEGMENT TABLE 807

| LINE SEGMENT ID 808 | COORDINATES OF STARTING POINT 809 | COORDINATES OF ENDING POINT 810 |
|---|---|---|
| L1 | (a1, b1) | (a2, b2) |
| L2 | (c1, d1) | (c2, d2) |
| ... | ... | ... |

FIG. 7

SYMBOL RECOGNIZING RULE 1000a

| KIND OF SYMBOL 1001a | CLASSIFI-CATION 1002a | SHAPE OF SYMBOL 1003a | POSITION OF CHARACTER STRING 1004a | DIRECTION OF CHARACTER STRING 1005a |
|---|---|---|---|---|
| EXTERNAL AGENT | SIMPLE | LONG VECTORS = 4; SHORT VECTORS = 0; NUMBER OF RIGHT ANGLES = 4; PAIRS OF PARALLEL LINES = 2 | INSIDE | HORIZONTAL |
| PROCESS | SIMPLE | LONG VECTORS = 0; SHORT VECTORS = MANY; NUMBER OF OBTUSE ANGLES = MANY | INSIDE | HORIZONTAL |
| FILE | SIMPLE | LONG VECTORS = 3; NUMBER OF RIGHT ANGLES = 2; PAIRS OF PARALLEL LINES = 1; ... | INSIDE | HORIZONTAL |

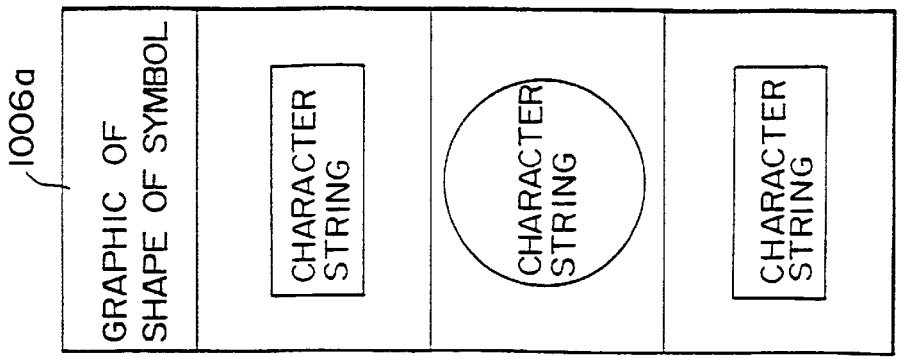

GRAPHIC OF SHAPE OF SYMBOL 1006a

FIG. 8

FLOW RECOGNIZING RULE 1010a

| KIND OF FLOW 1011a | POSITION OF ARROW 1012a | SHAPE OF FLOW 1013a | POSITION OF CHARACTER STRING 1014a | DIRECTION OF CHARACTER STRING 1015a |
|---|---|---|---|---|
| SINGLE-DIRECTED FLOW | TERMINAL POINT | ACUTE ANGLE = 1; SHORT VECTORS = 2; LONG VECTORS ≧ 1 | UP OR DOWN | HORIZONTAL |
| DOUBLE-DIRECTED FLOW | TERMINAL POINT | NUMBER OF ACUTE ANGLES = 2; SHORT VECTORS = 2; LONG VECTORS ≧ 1 | UP OR DOWN | HORIZONTAL |

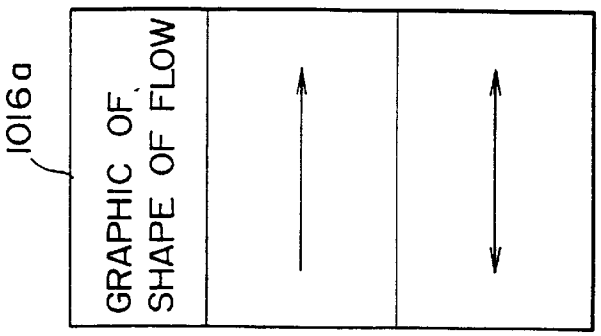

| GRAPHIC OF SHAPE OF FLOW 1016a |
|---|
| ↑ |
| ↕ |

FIG. 9

RELATIONSHIP RECOGNIZING RULE 1020a

| KIND OF INPUT SYMBOL | KIND OF OUTPUT SYMBOL 1024a | | |
|---|---|---|---|
| 1021a  1023a  1022a | EXTERNAL AGENT | PROCESS | FILE |
| EXTERNAL AGENT | UNCONNECTABLE | SINGLE-DIRECTED FLOW OR DOUBLE-DIRECTED FLOW | UNCONNECTABLE |
| PROCESS | SINGLE-DIRECTED FLOW OR DOUBLE-DIRECTED FLOW | SINGLE-DIRECTED FLOW OR DOUBLE-DIRECTED FLOW | SINGLE-DIRECTED FLOW OR DOUBLE-DIRECTED FLOW |
| FILE | UNCONNECTABLE | SINGLE-DIRECTED FLOW OR DOUBLE-DIRECTED FLOW | UNCONNECTABLE |

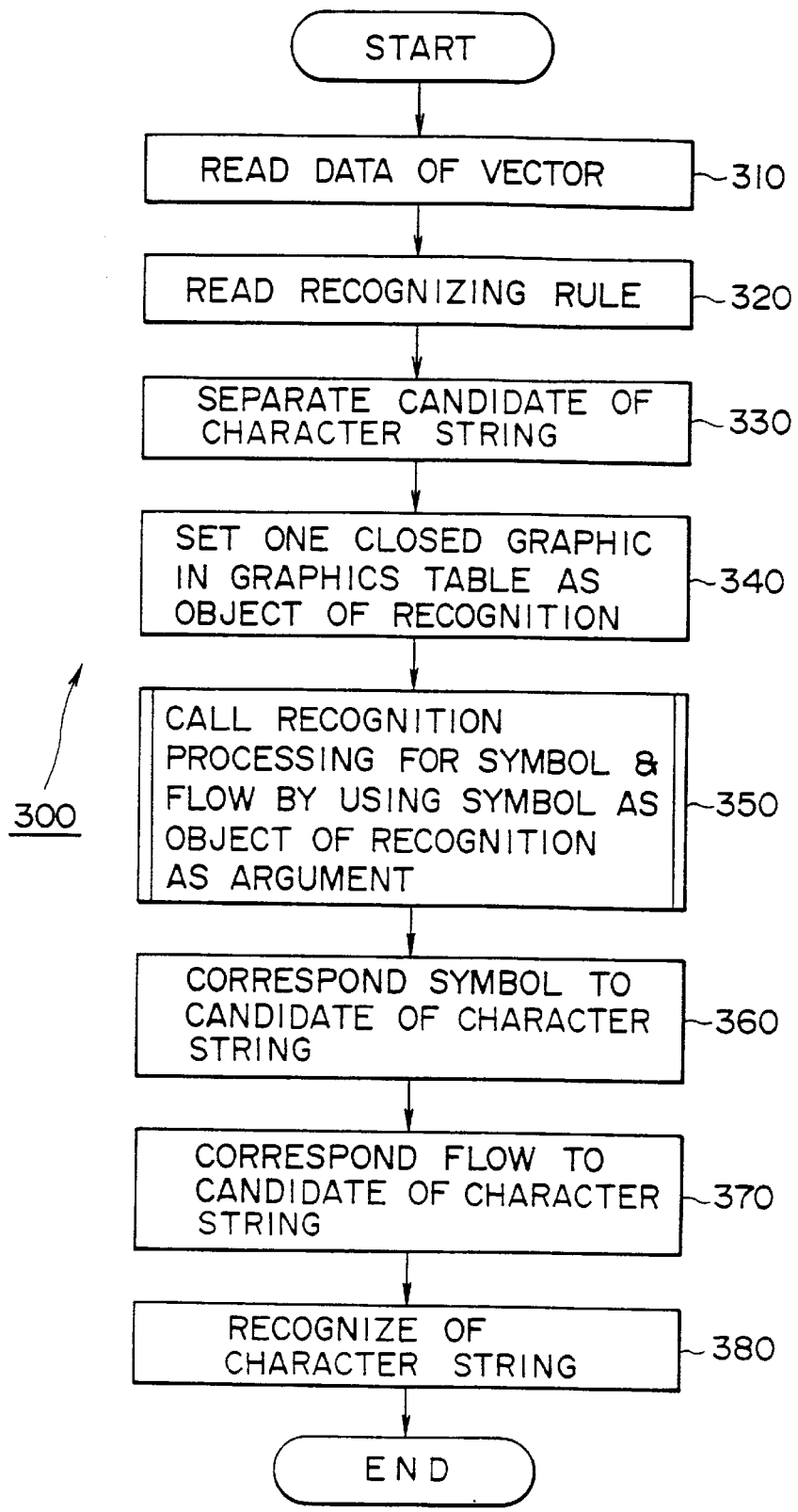

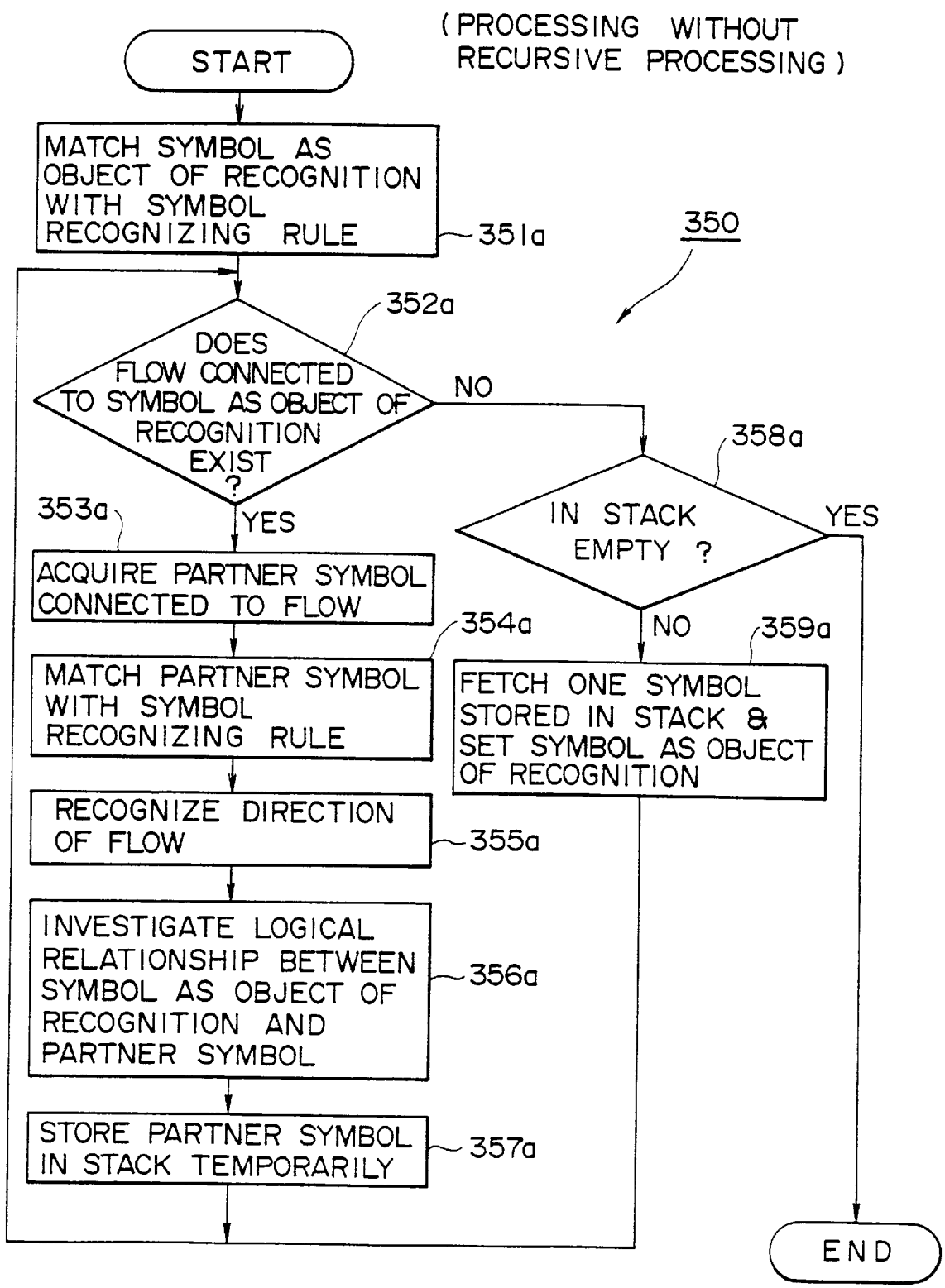

SYMBOL TABLE 900

| SYMBOL ID (901) | KIND OF SYMBOL (902) | DECISION OF RECOGNITION (903) | ID OF CORRES. CHARACTER STRING (904) | CORRES. VECTOR DATA (905) |
|---|---|---|---|---|
| S1 | EXTERNAL AGENT | OK | C1 | ● |
| S2 | PROCESS | OK | C3 | ● |
| S3 | — | NG | — | ● |

FIG. 12(b)

FLOW TABLE 910

| FLOW ID 911 | DIRECTION OF FLOW 912 | INPUT SYMBOL ID 913 | OUTPUT SYMBOL ID 914 | DECISION OF RECOGNITION 915 | DECISION OF CONNECTION 916 | ID OF CORRES. CHARACTER STRING 917 | CORRES. VECTOR DATA 918 |
|---|---|---|---|---|---|---|---|
| f1 | SINGLE | S1 | S2 | OK | OK | C2 | ● → 5 |
| f2 | SINGLE | S3 | S1 | OK | OK | C4 | ● → 4 |
| | | | | | | | |
| | | | | | | | |
| | | | | | | | |
| | | | | | | | |

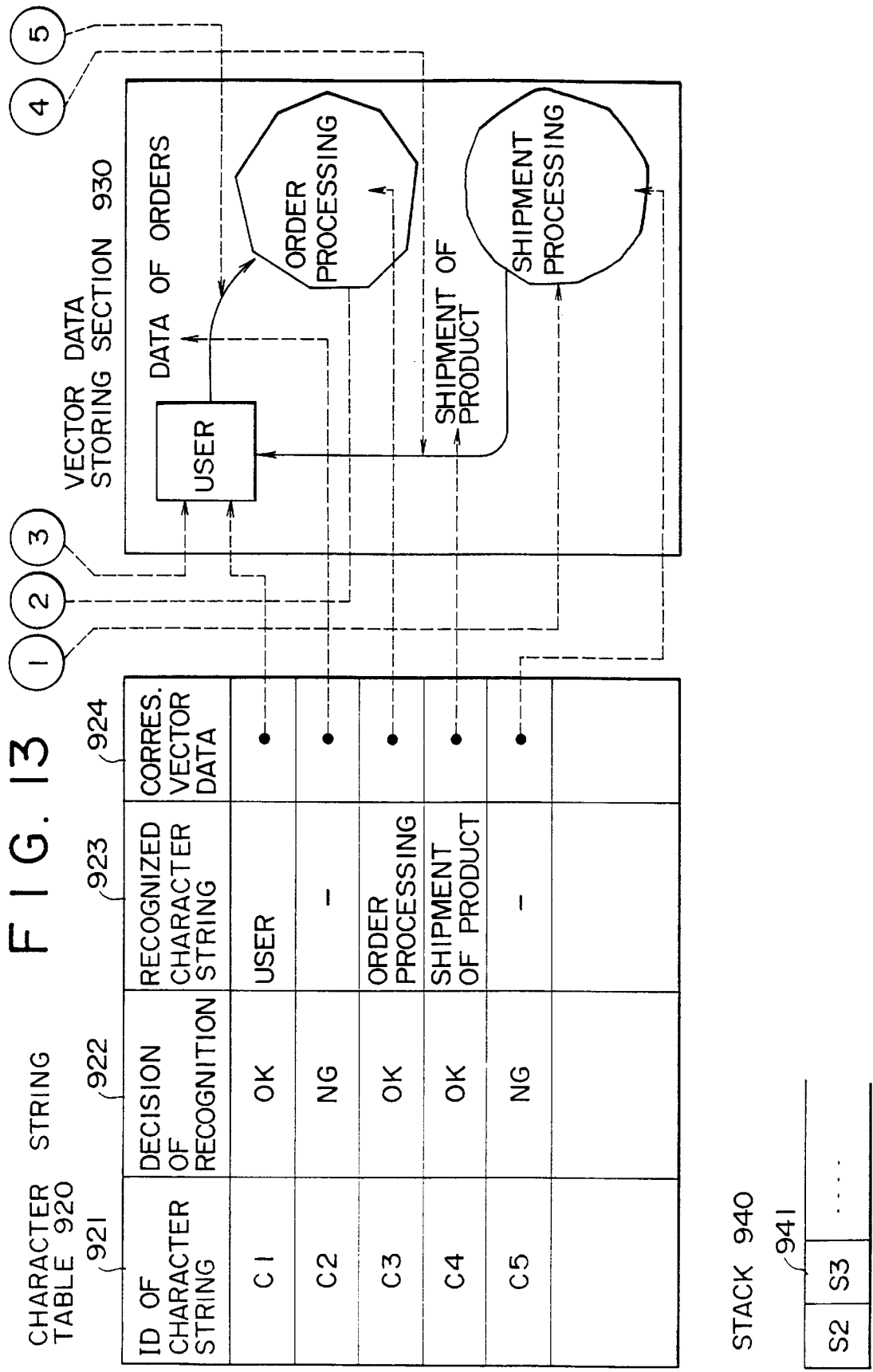

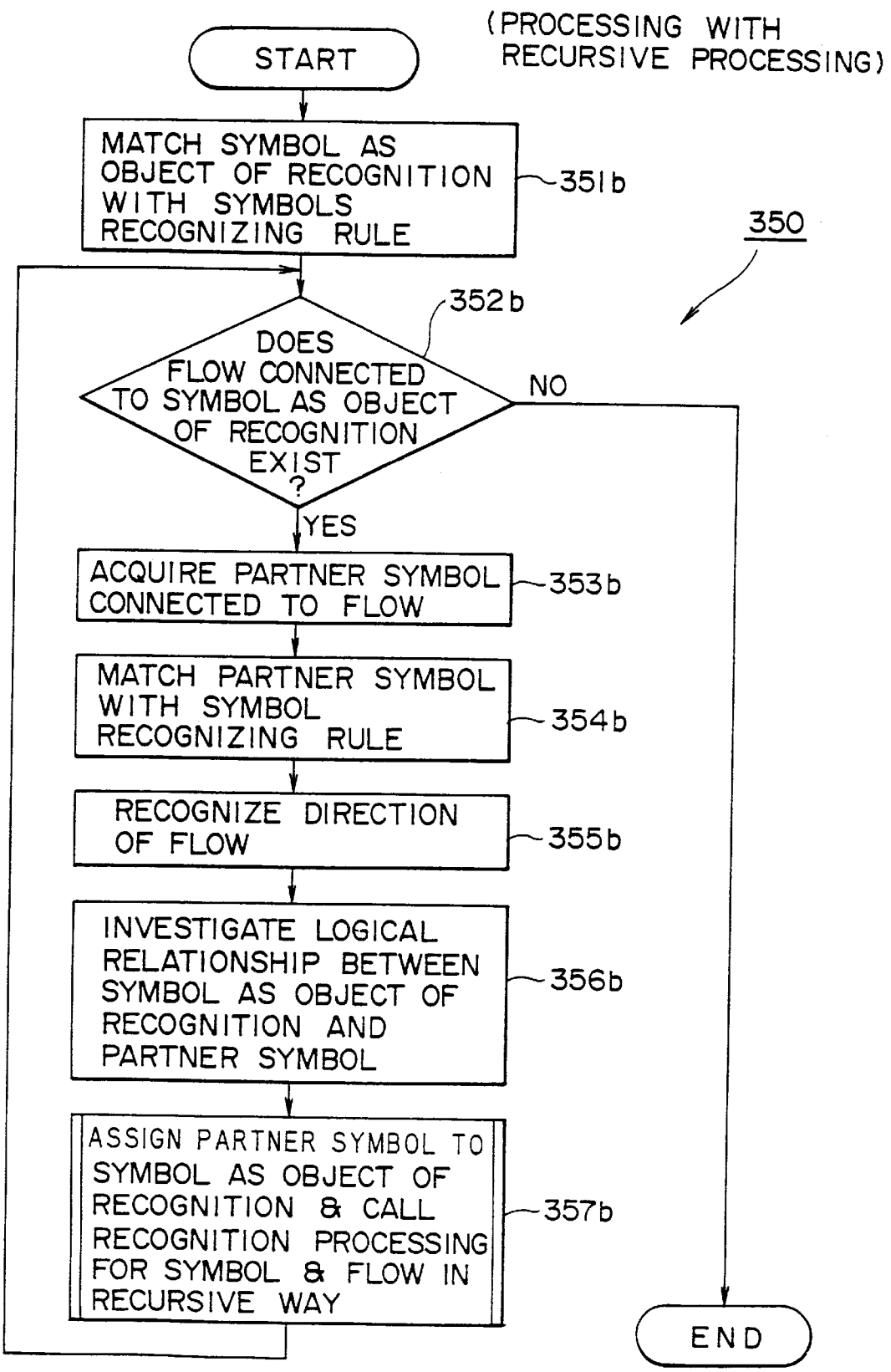

F I G. 15
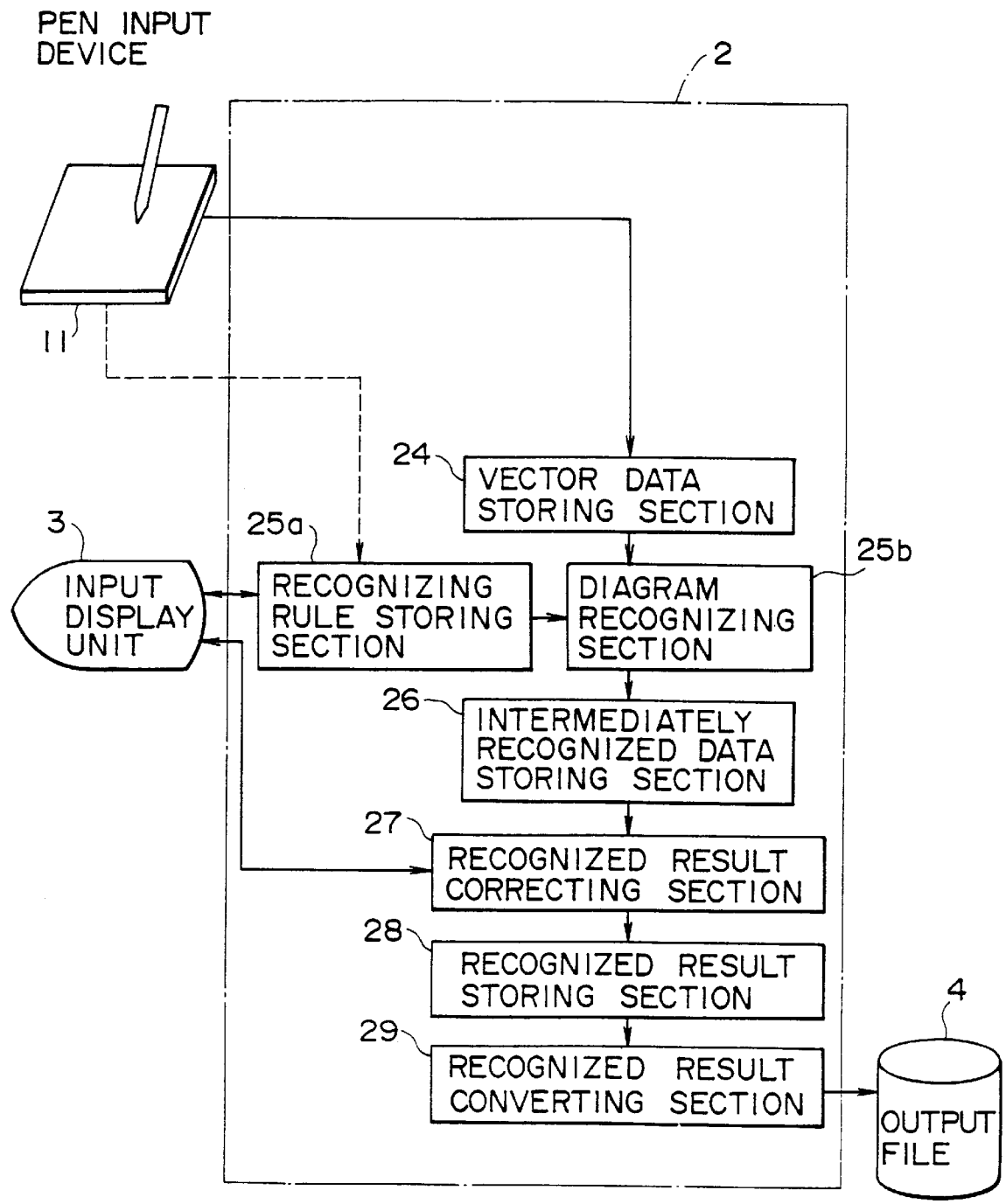

FIG. 17

(RECOGNIZING RULE FOR ENTITY RELATIONSHIP DIAGRAM)

SYMBOL RECOGNIZING RULE 1000b

| KIND OF SYMBOL 1001b | CLASSIFI-CATION 1002b | SHAPE OF SYMBOL 1003b | POSITION OF CHARACTER STRING 1004b | DIRECTION OF CHARACTER STRING 1005b |
|---|---|---|---|---|
| ENTITY | SIMPLE | LONG VECTORS = 4; SHORT VECTORS = 0; NUMBER OF RIGHT ANGLES = 4; PAIRS OF PARALLEL LINES = 2 | INSIDE | HORIZONTAL |
| RELATION-SHIP | SIMPLE | LONG VECTORS = 4; SHORT VECTORS = 0; NUMBER OF ACUTE ANGLES = 2; NUMBER OF OBTUSE ANGLES = 2 | INSIDE | HORIZONTAL |
| WEAK ENTITY | COMPOSITE | ORIGINAL SYMBOL = ENTITY; SYMBOL CONTAINED INSIDE = ENTITY | INSIDE | HORIZONTAL |

| GRAPHIC OF SHAPE OF SYMBOL 1006b |
|---|
| [rectangle] CHARACTER STRING |
| [diamond] CHARACTER STRING |
| [double rectangle] CHARACTER STRING 1006c |

FIG. 18

RELATIONSHIP RECOGNIZING RULE 1020b

| KIND OF INPUT SYMBOL 1021b | KIND OF OUTPUT SYMBOL 1022b | | |
|---|---|---|---|
| | ENTITY 1023b | RELATIONSHIP | WEAK ENTITY 1024b |
| ENTITY | NONE | UNDIRECTED FLOW | NONE |
| RELATIONSHIP | UNDIRECTED FLOW | NONE | UNDIRECTED FLOW |
| WEAK ENTITY | NONE | UNDIRECTED FLOW | NONE |

FIG. 20(a)

SYMBOL RECOGNIZING RULE 2000

| KIND OF SYMBOL | CLASSIFI-CATION | SHAPE OF SYMBOL | POSITION OF CHARACTER STRING | DIRECTION OF CHARACTER STRING | CLASS |
|---|---|---|---|---|---|
| EXTERNAL AGENT | SIMPLE | NUMBER OF LONG VECTORS = 4; MINIMUM OF NUMBER OF SHORT VECTORS = 0; NUMBER OF ACUTE ANGLES = 0~2; NUMBER OF RIGHT ANGLES = 0~4; NUMBER OF OBTUSE ANGLES = 0~2; TOTAL NUMBER OF ANGLES = 4; PAIRS OF PARALLEL LINES = 0~2 | INSIDE ~2002 | HORIZONTAL | CLOSED GRAPHIC |
| PROCESS | SIMPLE | NUMBER OF LONG VECTORS = 0; MINIMUM OF NUMBER OF SHORT VECTORS = 10; NUMBER OF ACUTE ANGLES = 0; NUMBER OF RIGHT ANGLES = 0; NUMBER OF OBTUSE ANGLES = 0; TOTAL NUMBER OF ANGLES = 2; PAIRS OF PARALLEL LINES = 0 | INSIDE | HORIZONTAL | CLOSED GRAPHIC |
| FILE | SIMPLE | NUMBER OF LONG VECTORS = 3; MINIMUM OF NUMBER OF SHORT VECTORS = 0; NUMBER OF ACUTE ANGLES = 0~2; NUMBER OF RIGHT ANGLES = 0~2; NUMBER OF OBTUSE ANGLES = 0~2; TOTAL NUMBER OF ANGLES = 2; PAIRS OF PARALLEL LINES = 0~1 | INSIDE | HORIZONTAL | OPEN GRAPHIC |

TABLE FOR CALCULATING EVALUATION POINTS 2010

| RECOGNIZING RULE 2011 | SCORE TO BE ADDED WHEN VALUE OF RECOGNIZING RULE COMPLIES 2012 | SCORE TO BE DEDUCTED WHEN VALUE OF RECOGNIZING RULE VARIES BY ONE 2013 |
|---|---|---|
| NUMBER OF LONG VECTORS | 100 | -30 |
| MINIMUM OF NUMBER OF SHORT VECTORS | 50 | -10 |
| NUMBER OF ACUTE ANGLES | 30 | -10 |
| NUMBER OF RIGHT ANGLES | 30 | -10 |
| NUMBER OF OBTUSE ANGLES | 30 | -10 |
| TOTAL NUMBER OF ANGLES | 30 | -10 |
| PAIRS OF PARALLEL LINES | 50 | -10 |

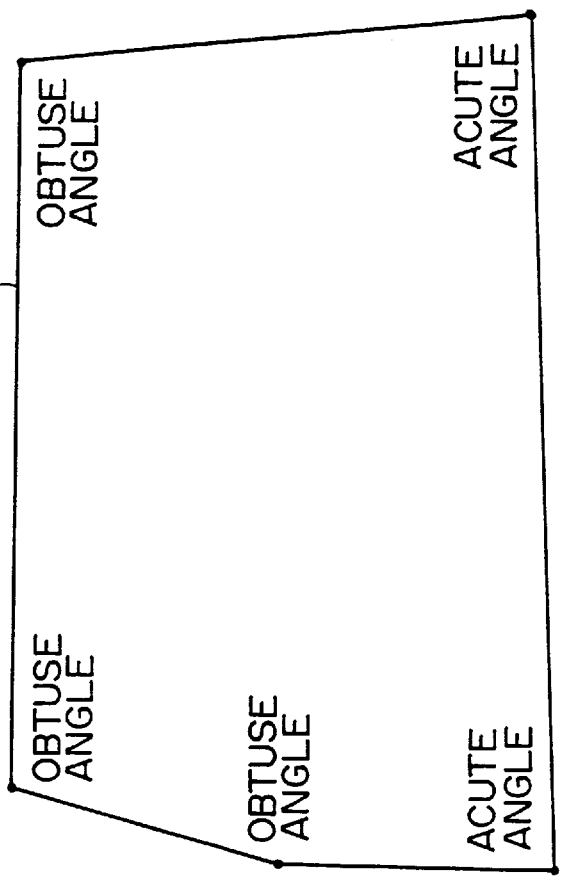

FIG. 21(b)

RESULT OF EVALUATION: 2110

| RECOGNIZING RULE | QUANTIFICATION OF SHAPE OF GRAPHIC | EXTERNAL AGENT | | PROCESS | | FILE | |
|---|---|---|---|---|---|---|---|
| | | DIFFE-RENCE | EVALUA-TION POINTS | DIFFE-RENCE | EVALUA-TION POINTS | DIFFE-RENCE | EVALUA-TION POINTS |
| NUMBER OF LONG VECTORS | 5 | — | 70 | 5 | −50 | 2 | 40 |
| MINIMUM OF NUMBER OF SHORT VECTORS | 0 | 0 | 50 | 10 | −50 | 0 | 50 |
| NUMBER OF ACUTE ANGLES | 2 | 0 | 30 | 0 | 30 | 0 | 30 |
| NUMBER OF RIGHT ANGLES | 0 | 0 | 30 | 0 | 30 | 0 | 30 |
| NUMBER OF OBTUSE ANGLES | 3 | — | 20 | 0 | 30 | 1 | 20 |
| TOTAL NUMBER OF ANGLES | 5 | — | 20 | 5 | −20 | 3 | 0 |
| PAIRS OF PARALLEL LINES | 0 | 0 | 50 | 0 | 50 | 0 | 50 |
| TOTAL OF EVALUATION POINTS | | — | 270 | — | 20 | — | 220 |

METHOD FOR DIAGRAM RECOGNITION BY USING RECOGNIZING RULES AND SYSTEM FOR IMPLEMENTING THE METHOD

This is a continuation application of Ser. No. 07/975,684, filed Nov. 13, 1992, now abandoned.

BACKGROUND OF THE INVENTION

1. Field of the Invention

The present invention relates to a diagram recognizing system and, more particularly, to a diagram recognizing system so adapted as to recognize a diagram to be employed for describing a specification for data processing, such as flowcharts, data flow diagrams, and the like, of documents for developing and maintaining a data processing system, to convert the recognized diagram into logical data indicative of its logical meaning, and to generate the logical data.

2. Description of the Related Art

Recently, there have been proposed and employed techniques for analyzing and designing a system, having both accuracy in the specification for data processing and ease in understanding it, by representing a procedure of the data processing for a data processing system or the like.

For instance, such techniques may include a structured analysis technique proposed by T. DeMarco (DeMarco, T.; Structured Analysis And System Specification; Prentice-Hall, 1978) and a technique for information engineering, systematized by J. Martin (Martin, J.; Information Engineering, Book I: Introduction, Prentice-Hall, 1989).

As a specific example of these techniques, there is commercially employed a reverse engineering system for forming an entity relationship diagram from definition data of DB2, IDMS, VSAM, and IMS, which are IBM's database and files, as a tool for forming a logical structure of data from the database definition data of text file data such as a source program of a developed information system, database definition data, job control statement, linkage parameter, input-output map, and the like, as indicated by Data Analyst of Buchman, Inc. (Sato, M.; CASE Tool; Explanation of Its Functions and Know How of Its Application, page 219, Nov. 1, 1989).

On the other hand, as CASE (Computer Aided Software Engineering) tools for aiding operations for forming a source program on the basis of these techniques, there have been commercialized Excelerator (Index Technology, Inc.) and IEW (Information Engineering Workbench: KnowledgeWare, Inc.), which are employed mainly in the U.S. and Europe (Nakamura, M.: Evolving CASE; Exploding "Walls" Among Steps & Providing Smooth Development Environments: Nikkei Computer; pages 78–101, Nov. 5, 1990).

It can be noted, however, that the CASE tools, which set fourth the formation of a diagram as a premise, are thought to spread even in the U.S. at a rate as high as 10%, so that the situation is not yet ripe in which system analysts and system engineers can always utilize the CASE tools. Hence, system analysts and system engineers are usually employing techniques for manually drawing diagrams with rulers, templates and the like and allowing operators to enter the diagrams into the CASE tools or for forming diagrams by making use of drawing software, which is far less expensive than the CASE tools, and entering the formed diagrams into the CASE tools.

The diagrams formed manually or through the drawing software in the manner as described hereinabove, however, are independent from the CASE tools, so that the delivery to downstream steps, such as the verification of matching with the specification as the CASE tool, the editing to be done with the logical meaning of the diagrams taken into account, and the automated formation of engineering data or a source program, should be conducted by manual operations. Hence, these techniques present the problems that the verification of accuracy of conversion operations, compliance of the specification with the program, maintenance of the diagrams, and the like are rendered very difficult.

To this end, demands have been made to develop and realize a system that can automatically recognize a diagram formed manually or through drawing software and deliver the diagram to the CASE tool without any manual assistance.

It can be noted herein that, as a similar technique, for instance, Hitachi, Ltd. has commercialized an intelligent system for recognizing account books and vouchers (BELIEVE) (Tsuchiya, M.; Jimu to Keiei: An Intelligent System for Recognizing Account Books & Vouchers As An Instant Power Potential; pages 8–10, September, 1990). This system, enters accounting vouchers and slips as data of an image, allows a recognition of a voucher style and a recognition of fields, and automatically forms programs for implementing operations for issuing the vouchers and printing the books.

Further, Japanese Patent Publication Laid-open (kokai) No. 71,366/1990 discloses a system for forming an E-R model, which is so adapted as to enter an entity relationship diagram (an E-R model diagram) for forming a model of data within an information system, as data of an image, and to allow a graphic recognition to thereby form the E-R model in an automatic way.

In addition, as indicated by M. Hirata (An Input System for Automatically Entering Drawings of Logical Circuits: Demonstrating Its Effect by Restricted Uses; Nikkei Computer Graphics; page 18, February, 1988), a system for automatically recognizing a drawing of a logical circuit, developed by Matsushita Electric Industries, Co., Ltd., is so adapted as to read the drawing of the logical circuit of hardware as data of an image, to recognize symbols, characters, and relationships of connection between the symbols, and to store them in a database.

The system for automatically recognizing the drawing of the logical circuit, however, is so adapted as to enter the drawing of the logical circuit of the hardware, so that it cannot be applied to the recognition of a diagram describing a data system. The diagram describing the data system offers the characteristics that it is important to distinguish the directivity of the relationship of connection between the symbols, that the number of connecting lines to be connectible to each of the symbols is optional, that there is regularity among the connectible symbols, that the shape and the meaning of each of the symbols can be modified or added for each user, and the like. Hence, the problem resides in the fact that the automated system cannot be applied to the recognition of diagrams such as data flow diagrams, entity relationship diagrams, flowcharts, and the like.

Further, the intelligent system for recognizing the account books and vouchers, as described hereinabove, is so designed as to recognize formats, such as account books and vouchers composed of spreadsheets which are delimited and surrounded by straight lines only, to detect positions of the characters within the format, and to recognize the data. This system, however, cannot recognize diagram data unless the positions of symbols, connecting lines or a sequence of characters have been defined in advance.

Furthermore, the system for forming the E-R model as described hereinabove is designed exclusively for forming the entity relationship diagram in which the number of symbols to be employed is limited to several kinds; hence, it has the problem that, although it can be applied only to the recognition of the shape and the meaning of a predetermined diagram, it cannot be applied to the recognition of a diagram that should be defined by each user in a manner as have conventionally been conducted.

SUMMARY OF THE INVENTION

Therefore, the object of the present invention is to solve the problems presented by the prior art techniques and to provide a diagram recognizing system capable of automatically recognizing a diagram formed manually or with drawing software, or formed independently from the CASE tool, particularly a diagram which has a directivity with respect to the relationship of connection between the symbols, in which the positions of the symbols are not defined in advance, and which is defined optionally by each of the users, and is capable of delivering the recognized logic to the CASE tool or the like without any manual operation.

In order to achieve the aforesaid object, the present invention consists of a diagram recognizing system comprising a diagram input means for entering a diagram to be employed for describing a specification of data processing as data of an image, which is composed of a symbol to be represented by a drawing such as a circle, a rectangle and the like, a connecting line having a directivity indicative of a connection between symbols, and a character string to be provided on the symbols and the connecting line, such as a flowchart, a data flow diagram or the like; a recognizing rule input means for entering a recognizing rule for recognizing the diagram to be entered by the diagram input means; a recognizing rule storing means for storing the recognizing rule entered by the recognizing rule input means; a diagram recognizing means for recognizing the symbol, the connecting line, and the character string, each structuring the diagram entered from the diagram input means, as well as the connected relationship of the connection of the symbols, on the basis of the recognizing rule stored by the recognizing rule storing means, and for generating the kind of the symbol and the character string as well as the connected relationship of the connection between the symbols as logical data; and a conversion means for converting the logical data generated from the diagram recognizing means into a predetermined file format.

With the arrangement as described hereinabove, the recognizing rule for recognizing the diagram as the object of recognition is entered from the recognizing rule input means, and it is stored in the recognizing rule storing means. Then, the diagram as the object of recognition is entered as the data of the image from the diagram input means. Upon the input of the diagram as the data of the image, the diagram recognizing means recognizes the symbols, the connecting lines, and the character string, each structuring the diagram entered from the diagram input means, as well as the relationship of connection between the symbols on the basis of the recognizing rule, and it generates the kind of the symbols and the character string as well as the relationship of connection between the symbols as the logical data. The logical data generated from the diagram recognizing means are converted into a predetermined file format by the conversion means so as to be delivered directly to the CASE tools or the like and then generated.

Other objects, features and advantages of the present invention will become apparent in the course of the description of the preferred embodiments, which follows, with reference to the accompanying drawings.

BRIEF DESCRIPTION OF THE DRAWINGS

FIG. 4 is a schematic representation showing an example of logical data to be generated as the result of recognition according to the first embodiment of the present invention.

FIG. 5($b$) is a table for describing the store structure.

FIG. 6($b$) is a table of a graphic for describing the data of the vector as shown in FIG. 6($a$).

FIG. 6($c$) is a table of line segments for describing the data of the vector as shown in FIG. 6($a$).

FIG. 7 is a table for describing the definition of the recognizing rule for recognizing symbols.

FIG. 8 is a table for describing the definition of the recognizing rule for recognizing connecting lines.

FIG. 9 is a table for describing the definition of the recognizing rule for recognizing the connected relationship of connection among the symbols.

FIG. 10 is a flowchart showing the details of the diagram recognizing processing.

FIG. 11 is a flowchart showing the symbol recognizing processing and the flow recognizing processing, each using no recursive processing.

FIG. 13 is a table showing a portion of data indicating the intermediate result of recognition.

FIG. 14 is a flowchart showing the symbol recognizing processing and the flow recognizing processing of FIG. 10, with the recursive processing employed therein.

FIG. 15 is a block diagram showing a data processing system according to a second embodiment of the present invention.

FIG. 17 is a table for describing another example of the definition of the recognizing rule for recognizing symbols.

FIG. 18 is a table for describing another example of the definition of the recognizing rule for recognizing connect lines.

FIGS. 20($a$) and 20($b$) are a table for describing the calculation of evaluation points for the recognizing method.

FIGS. 21($a$) and 21($b$) are a schematic representation indicating the result of recognition on the basis of the result of calculation of the evaluation points for a shape of the graphic.

DESCRIPTION OF THE PREFERRED EMBODIMENTS

The present invention will be described more in detail with reference to the accompanying drawings.

Figure 1:
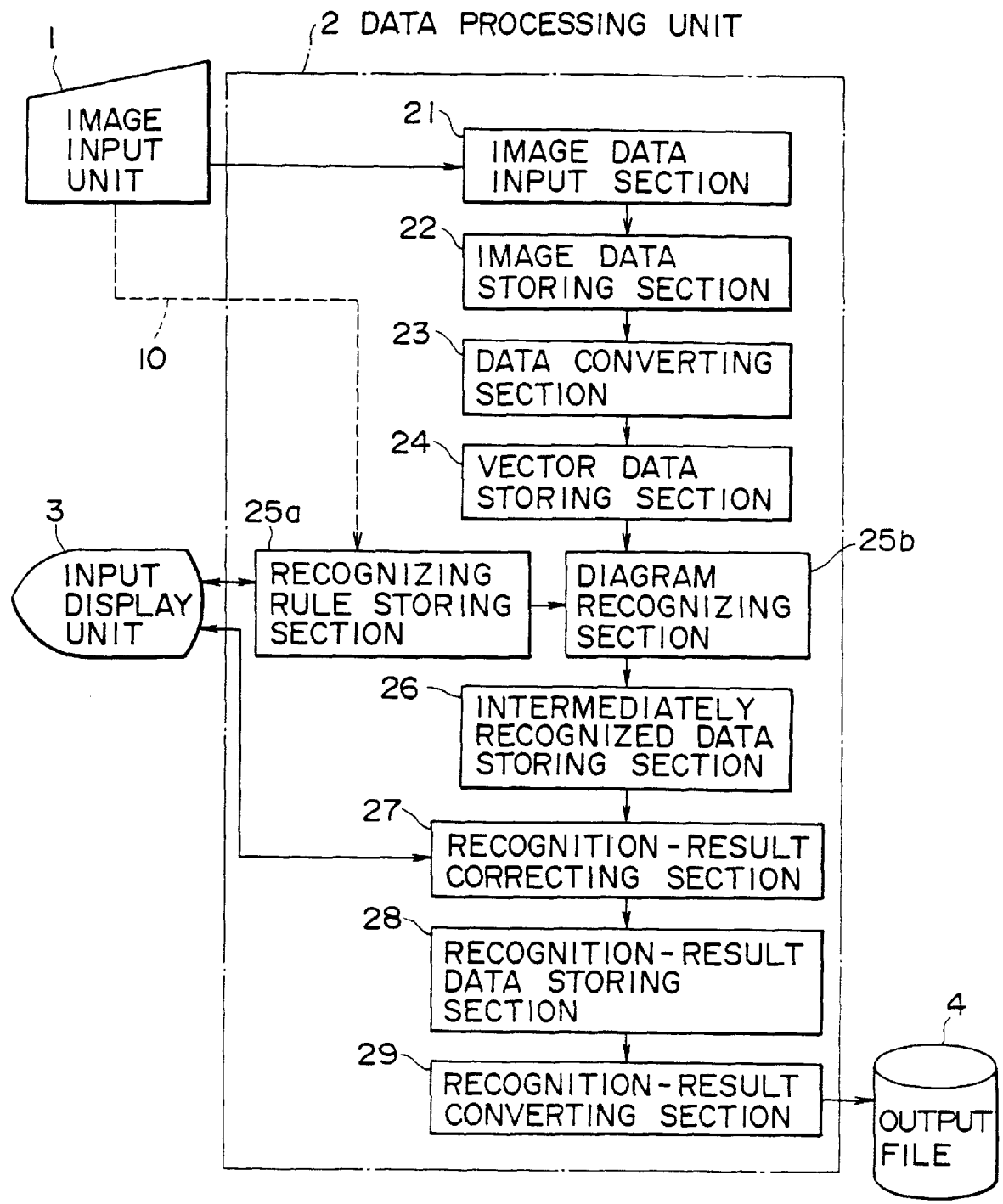
FIG. 1 is a block diagram showing a data processing system according to a first embodiment of the present invention.

FIG. 1 is a block diagram showing the data processing system according to the first embodiment of the present invention. The data processing system according to the first embodiment of the present invention comprises an image input unit 1 for entering a diagram as the object of recognition as data of an image, a data processing unit 2 for implementing the processing for recognizing the diagram, an input display unit 3 for allowing the user to correct the result of recognition, and an output file 4 for storing the result of recognition.

The data processing unit 2 comprises an image data input section 21 for entering data of an image of the diagram that is represented by logic 1 and logic 0 corresponding to the presence and the absence of the image of a pixel on a plane of the diagram on which the diagram is read, respectively; an image data storing section 22 for storing the data of the image entered by the image data input section 21; a data converting section 23 for converting the data of the image stored in the image data storing section 22 into data of a vector as an aggregate of line segments; a vector data storing section 24 for storing data of the vector; a recognizing rule storing section 25a for describing a logical recognizing rule, such as the kind of diagram corresponding to a graphic characteristic, the relationship of connection between the diagrams, and the like, in order to recognize the diagram; a diagram recognizing section 25b for recognizing the diagram by matching the recognizing rule stored in the recognizing rule storing section 25a with the data of the vector stored in the vector data storing section 24; an intermediately recognized data storing section 26 for storing the result of recognition obtained by the diagram recognizing section 25b; a correction section 27 for correcting an unrecognizable portion of the result of recognition stored in the intermediately recognized data storing section 26 through a manual operation by the user on the image display unit 3; a recognized data storing section 28 for storing the corrected result of recognition corrected by the correction section 27; and a recognized result converting section 29 for converting the contents of the recognized data storing section 28 into a data format in the output file 4.

For the data processing unit 2 having the structure as described hereinabove, the recognizing rule is stored in the recognizing rule storing section 25a and entered prior to the recognition processing from the image display unit 3 through the manual operation by the user. Further, the recognizing rule can be modified or added thereafter through the image display unit 3.

Figure 2:
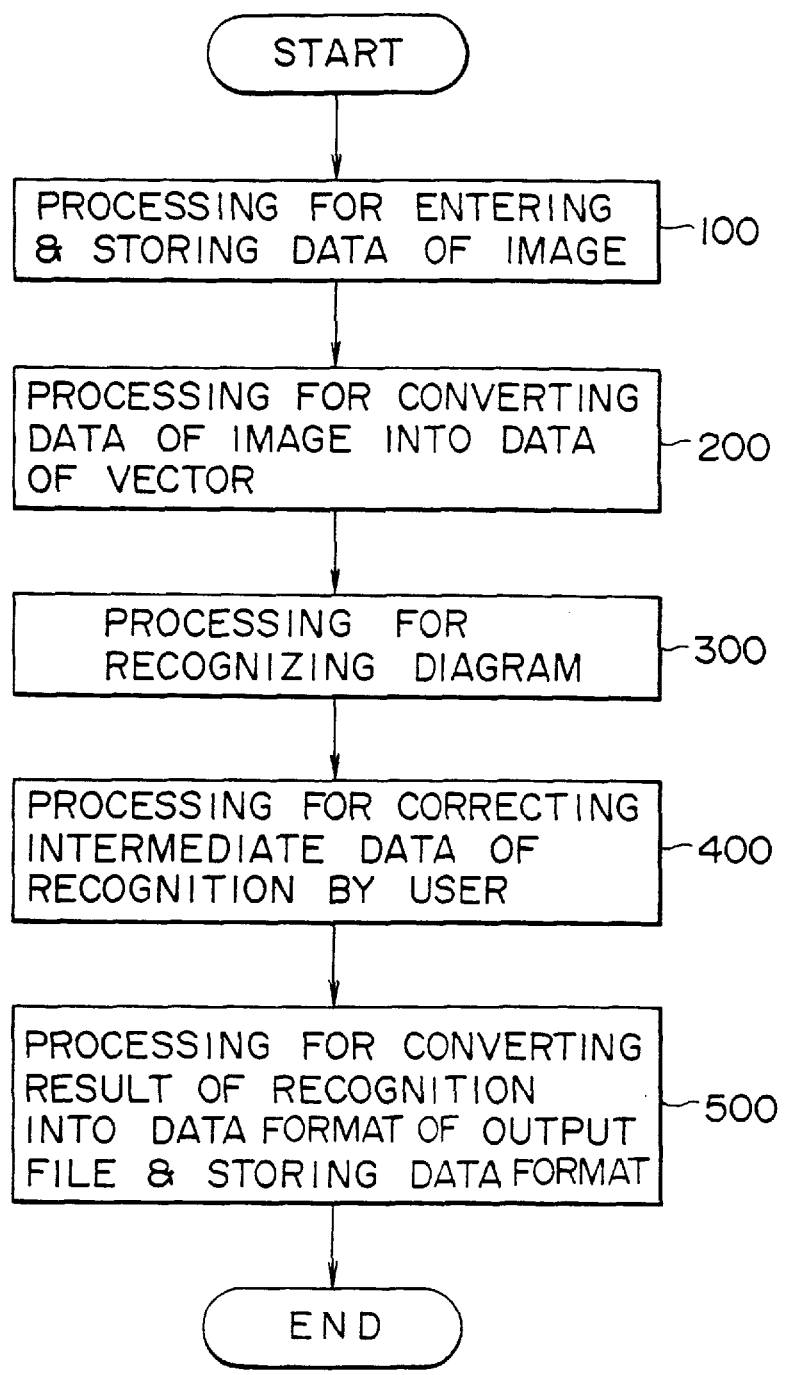
FIG. 2 is a flowchart showing a procedure for processing by the data processing system according to the first embodiment of the present invention.

FIG. 2 is a flowchart showing an outline of the processing procedure through the data processing unit 2. First, at step 100, a diagram as the object of recognition is read by the image input unit 1 and data of an image of the diagram is stored by the image data storing section 22 through the image data input section 21. Then, at step 200, the data of the image stored in the image data storing section 22 is read by the data converting section 23; it is then subjected to the processing for removing noises, thinning lines, and the like, by the data converting section 23; it is further converted into the data of the vector which is a collection of data indicative of an aggregate of line segments and representing a closed graphic or an open graphic; and it generates the graphics table 802 from said data of vector, and its graphics table 802 is stored in the vector data storing section 24. It is noted herein that a description on a detail of the technique for converting the data of the image into the data of the vector will be omitted because the technique is known as is described, for example, in a paper entitled "Making Input of Data for CAD Efficient: Highlighting An Automated Input Device for Drawings" by M. Hirata (Nikkei Computer, page 82, issued Mar. 3, 1986). Further, a known method for classifying the data of the vector into one of a group of open graphics and a group of closed graphics is described, for example, in a book entitled *Computer Image Processing Guide,* by H. Tamura (Soken Publishing Company, 1985), pages 220–222. This book describes an abstracting method of closed graphics by detecting an isolated diagram.

Figure 6A:
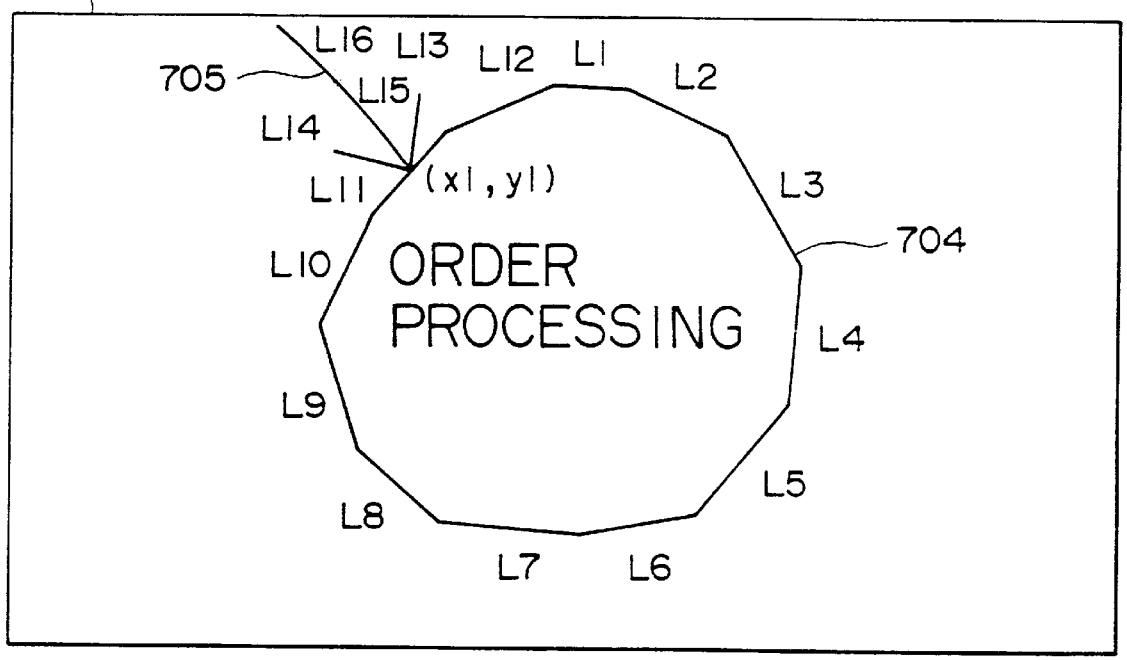
FIG. 6($a$) is a schematic representation showing an example of data of a vector converted from the symbol in FIG. 5($a$).

Then, the vector data of the character string, for example, "ORDER PROCESSING" in FIG. 6(a) is also stored in the graphics table 802, as the group of open and closed graphics.

Then, at step 300, the diagram recognizing section 25b is so adapted as to read the data of the vector stored in the vector data storing section 24 and the recognizing rule for recognizing the diagram, stored in the recognizing rule storing section 25a; to implement the processing for matching the data of the vector with the recognizing rule so as to recognize the diagram represented in the data of the vector; and to store the result of recognition in the intermediately recognized data storing section 26 as an intermediate result of recognition.

Further, at step 400, an inquiry is made through the image display unit 3 about an unrecognizable portion of the intermediate result of recognition stored in the intermediately recognized data storing section 26, thereby requiring the user to enter necessary data, and the unrecognized portion is corrected by the correction section 27 to provide a complete result of recognition of the diagram entered. The corrected result of recognition is then stored in the recognized result storing section 28.

At step 500, the recognized data converting section 29 is so adapted as to convert the data of the result of recognition stored in the recognized result storing section 28 into the logical data in a data format predetermined by the output file 4, for example, in such a data format as capable of being delivered directly to the CASE tool, and stores the resulting logical data in the output file 4.

Hence, the CASE tool as described hereinabove can carry the data over immediately to a downstream step without any manual operation on the basis of the logical data stored in the output file 4.

Figure 3:
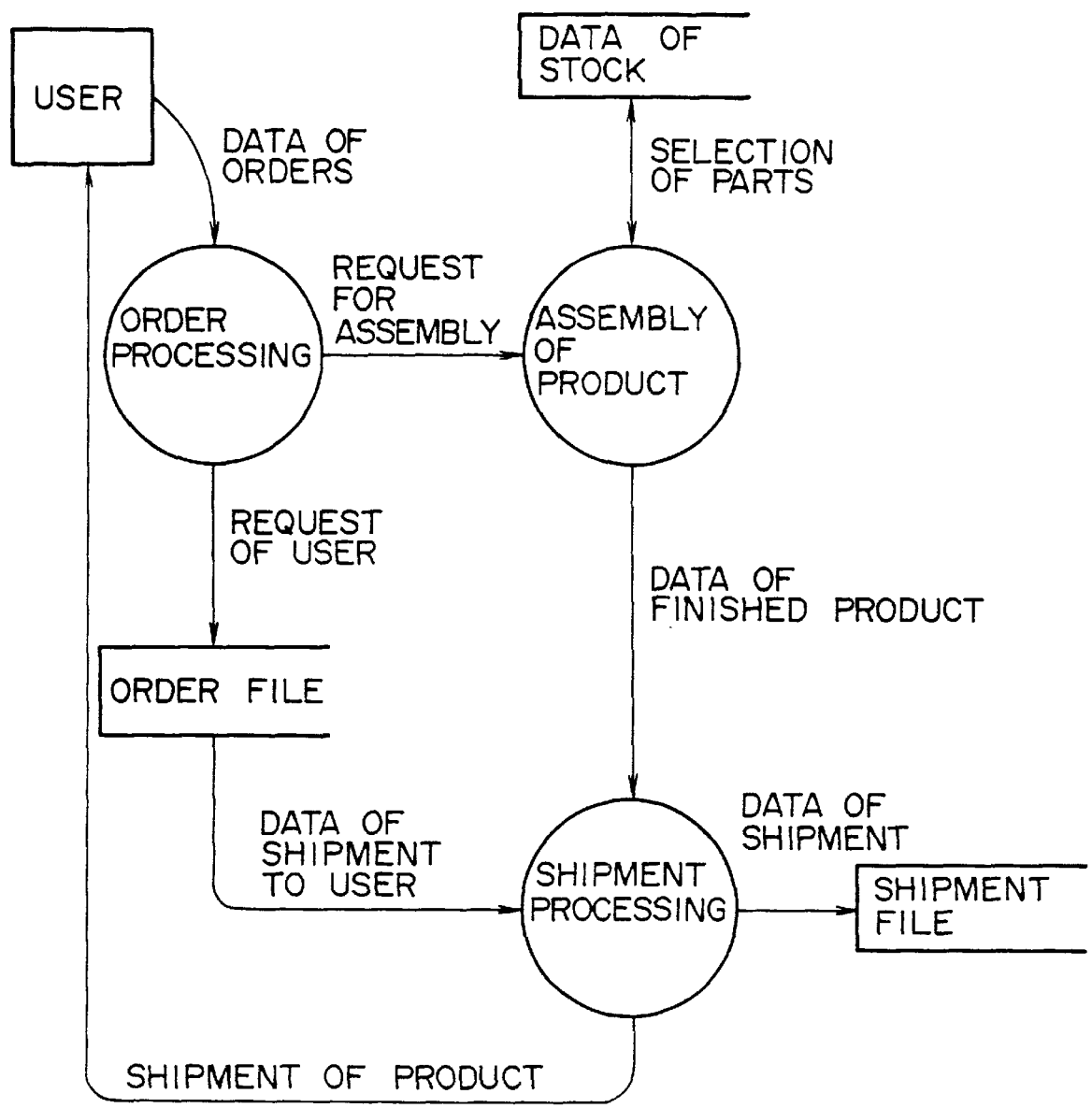
FIG. 3 is a view showing an example of a diagram to be entered in the first embodiment according to the present invention.

Next, a description will be made of a specific example of the recognition processing for recognizing the diagram with reference to FIG. 3 showing an example of a data flow diagram entered as the data of the image through the image input unit 1. This diagram may be written manually or drawn through drawing software and the logical relationship between the symbol and the connecting line for connecting the symbols can be judged only by the user. The diagram recognizing system according to the present invention is so adapted as to recognize such a diagram and to form logical data representing the name and the kind of the symbols and the relationship of connection between the symbols, as shown in FIG. 4.

Figures 5A, 5B:
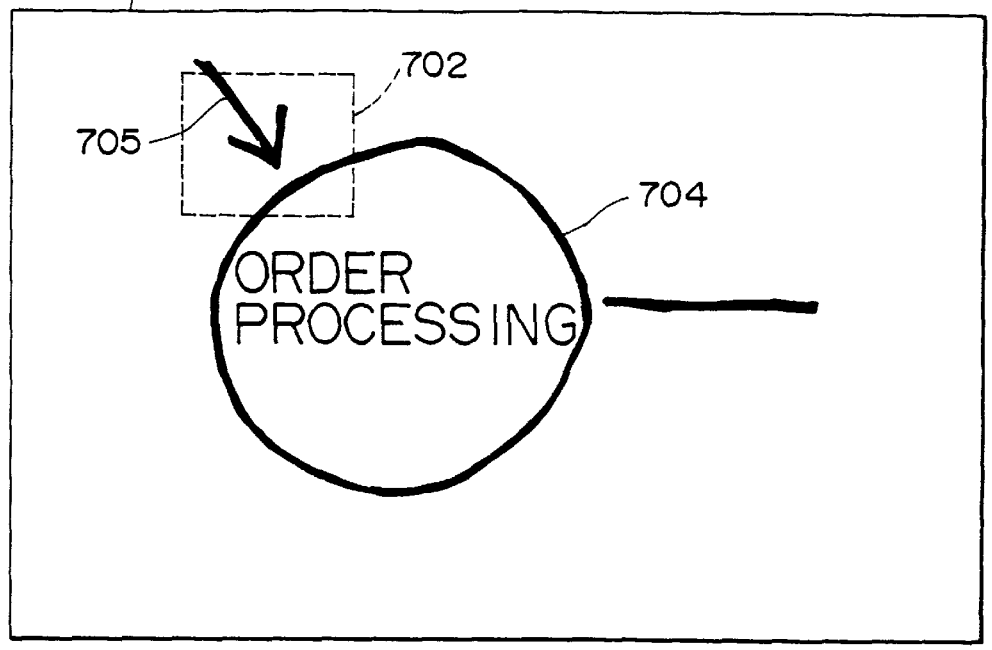
FIG. 5($a$) is a schematic representation showing a portion of data of an image for a symbol entered as a diagram.

FIG. 5(a) indicates an example of an image corresponding to a portion of the data flow diagram, as shown in FIG. 3, stored in the image data storing section 22. In FIG. 5(a), reference numeral 701 represents an example corresponding to a portion of the data of the image around a diagram indicative of a character string "ORDER PROCESSING" of FIG. 3, surrounded by a circular symbol 704. FIG. 5(b)

indicates a state of the pixels storing the data of the image corresponding to the portion as represented by reference numeral 702 in FIG. 5(*a*). The pixels indicated by "0" represent that no image exists, and the pixels indicated by "1" represent that an image exists.

FIGS. 6(*a*), 6(*b*) and 6(*c*) show an example of the data of the vectors converted from the data of the image, as shown in FIG. 5, which is stored in the vector data storing section 24. In FIG. 6(*a*), reference numeral 801 indicates an example of the data of the vector converted from the image data 701, which is displayed on the image display unit 3. The circular symbol 704 surrounding the sequence of the characters "ORDER PROCESSING" may be broken down into twelve line segments L1, L2, . . . , L12, and each of the line segments is represented by data in a vector type. Likewise, an arrow 705 may be divided into four line segments L13, L14, L15, and L16, and each of the line segments is represented by data in a vector type.

The vector data 801 as represented hereinabove are stored as a closed graphic or an open graphic as the unit of storage in a graphic table 802 of the vector data storing section 24. As specifically shown in FIG. 6(*b*), the graphic table 802 comprises data 803 of identification numbers of graphics (Graphic ID Nos.), indicative of an aggregate of line segments, data 804 of a class indicative of closed graphic or open graphic, data 805 indicative of an arrangement for the line segments structuring the graphic classified in the class data 804, and data 806 of a branched point or points of the corresponding graphic, indicative of the coordinates of the branched point or points. Further, as shown in FIG. 6(*c*), each of the line segments is so structured as to be managed by a line segment table 807 which in turn stores each of the line segments and comprises data 808 of the identification number of the line segment, data 809 of coordinates of a starting point of the line segment, and data 810 of coordinates of an ending point thereof.

It is to be noted herein, however, that the coordinates (x1, y1) of a branched point branched from the line segment L11 to the line segment L15 in FIG. 6(*a*) are represented on the drawing for reference only, and they are not displayed actually on a display screen.

FIGS. 7, 8 and 9 are each an example of the recognizing rule for recognizing the data flow diagram stored in the recognizing rule storing section 25*a*. The recognizing rule for recognizing the diagram comprises a symbol recognizing rule 1000*a* for recognizing symbols, a flow recognizing rule 1010*a* for recognizing connecting lines (flows), and a relationship recognizing rule 1020*a* for recognizing the relationship of connection between the symbols, respectively.

As shown in FIG. 7, the symbol recognizing rule 1000*a* contains data 1001*a* of the kind of symbol representing an external agent such as a user, process, and file, and the like; data 1002*a* of classification of the symbol into a simple graphic such as a circle, a rectangle, etc., or a composite graphic such as a combination of simple graphics; data 1003*a* of shapes of the symbols, indicative of a graphic characteristic of the corresponding symbol; data 1004*a* of positions indicative of the location of the character string inside or outside the corresponding symbol; and data 1005*a* of the directivity of the characters, (horizontal or vertical), in which the characters are written on the symbol.

For example, when the data 1003*a* of the shape of the symbol identify the symbol as a rectangle, the symbol is defined by data consisting of four line segments of a long vector, no line segment of a short vector, four right angles, and two pairs of parallel lines. Further, the shape of the symbol recognized by the symbol recognizing rule 1000*a* is illustrated by reference numeral 1006*a* as shown in FIG. 7.

As the recognizing rule representing the data 1003*a* indicative of the shape of a symbol, as shown in FIG. 7, there may be employed a number of long vectors, a minimum number of short vectors, a minimum and a maximum number of acute angles, a minimum and a maximum number of right angles, a minimum and a maximum number of obtuse angles, a sum of angles between the long vectors, a minimum and a maximum number of pairs of parallel lines, and the like. A class of the symbol indicative of the closed graphic or the open graphic may be added thereto. Further, as the recognizing rule, there may be added a minimum of the length to be recognized as a long vector and a maximum of the length to be recognized as a short vector. In addition, rules may be added in accordance with the symbols to be recognized or the graphic characteristics of the flows, in order to improve a rate of recognition.

As shown in FIG. 8, the flow recognizing rule 1010*a* contains data 1011*a* of the kind of flow, indicative of a single direction of the connecting line or two directions thereof; data 1012*a* of the position of the arrow, when the connecting line is provided with the arrow; data 1013*a* of the shape of the flow, indicative of the graphic characteristic of the connecting line; data 1014*a* of the position of the character string corresponding to the connecting line; and data 1015*a* of the direction, horizontal or vertical, in which the character string is written on the connecting line.

In the data 1013*a* of the shape of the flow, for instance, the connecting line in the single direction may be defined by data consisting of one or more line segments for a long vector, one acute angle, and two line segments for a short vector. The shape of the connecting line to be recognized by the flow recognizing rule 1010*a* is illustrated by reference numeral 1016*a,* as shown in FIG. 8.

As shown in FIG. 9, the relationship recognizing rule 1020*a* for recognizing the relationship of connection between the symbols consists of a combination of data 1021*a* of the kind of the input symbol with data 1022*a* of the kind of the output symbol; the data 1021*a* indicative of the kind of the input symbol may contain an external agent such as a user and the like, the process, and the file, and the data 1022*a* indicative of the kind of the output symbols may likewise contain the external agent, process, and the file. Further, the relationship recognizing rule 1020*a* is so arranged as to represent data 1023*a* and data 1024*a* in a matrix type, the data 1023*a* being indicative of an unconnectable combination of the data 1021*a* of the kind of the input symbol with the data 1022*a* of the kind of the output symbol and the data 1024*a* being indicative of the kind of connectable lines in the combination of the data 1021*a* with the data 1022*a*. As shown in FIG. 9, for instance, it is defined that the external agent, such as a "user", as the input symbol cannot be combined with the external agent, such as "user", as the output symbol and the file, such as "shipment file", as the input symbol cannot be combined with the file such as a "shipment file" as the output symbol. Hence, in this case, for instance, a cell that exists under the column 1022*a* "EXTERNAL AGENT" "KIND OF OUTPUT SYMBOLS" and that exists in the row "EXTERNAL AGENT" under the column 1021*a* "KIND OF INPUT SYMBOLS" is indicated as "UNCONNECTABLE", as indicated by reference numeral 1023*a,* because the data on the external agent under the column 1022*a* is not connectable with the data on the external agent in the row located under the column 1021*a*. Likewise, when the data existing under the column 1022*a* is unconnectable with the data existing in the row under the column 1021a, the corresponding cells are filled with the word "UNCONNECTABLE". For instance, the cell corresponding to the file as the kind of the output symbol and to the external agent as the kind of the input symbol is filled with the word "UNCONNECTABLE". On the other hand, the data 1021a of the kind of the input symbols relating to the external agent are to be connected with the data 1022a of the kind of the output symbols relating to the process, as shown in FIG. 9. Hence, in this case, the cell corresponding to both of the data in the row "EXTERNAL AGENT" and under the column "PROCESS" is filled with words "SINGLE-DIRECTED FLOW OR DOUBLE-DIRECTED FLOW", as indicated by reference numeral 1024a. Likewise, all the cells defined in this manner are filled with the same words.

FIG. 10 is a flowchart showing a detail of the diagram recognizing processing at step 300 in FIG. 2, and FIG. 11 is a flowchart showing a detail of the processing for recognizing the symbols and the flows at step 350 in FIG. 10, without using any recursive processing.

Now, a description will be made of the operations for recognizing the diagram represented in a vector type, with reference to the flowcharts as shown in FIGS. 10 and 11.

First, at step 310, the diagram recognizing section 25b reads data of a vector relating to the diagram as the object of recognition, which is stored in the vector data storing section 24, followed by proceeding to step 320 at which the recognizing rule stored in the recognizing rule storing section 25a is read. Then, at step 330, the diagram recognizing section 25b is so adapted as to separate the data of the vector indicative of a line segment having a length shorter than a predetermined length as a candidate of a character string. Further, at step 340, a search is made for the graphics indicated in the class data 804 of the graphic table 802 stored in the vector data storing section 24, and one closed graphic is fetched and set as a first object of recognition.

More specifically, for example, in the data of the vector as shown in FIG. 6(a), the class data 804 indicative of the symbol 704 surrounding the character string "ORDER PROCESSING" indicates the closed graphic, as shown in FIG. 6(b), so that the symbol 704 is set as the first object of recognition.

Then, at step 350, the recognition processing for recognizing the symbols and the flows, as shown in FIG. 11, is called using the symbol as an argument, thereby recognizing the kind of the symbol set as the first object of recognition on the basis of the symbol recognizing rule 1000a.

For example, for the symbol 704 for the character string "ORDER PROCESSING" as shown in FIG. 6(a), the graphic table 802 is so arranged as to store the line segments L1 to L12, inclusive, of the symbol 704, and the line segment table 807 is so arranged as to store a detail of the positions indicated by the data 809, indicative of the coordinates of the starting point of each line segment, and the data 810, indicative of the coordinates of the ending point thereof.

On the other hand, as shown in FIG. 7, the symbol recognizing rule 1000a for recognizing the symbol is so arranged as to define the shape of the symbol under the column "SHAPE OF SYMBOL", as indicated by reference numeral 1003a, corresponding to the row "PROCESS", as indicated by reference numeral 1001a, by no long vectors, a large number of short vectors, a large number of obtuse angles, and the like. In the recognition processing at step 350, the length of each of the line segments L1 to L12, inclusive, is given by the data 809 indicative of the coordi-nates of the starting points and the data 810 indicative of the coordinates of the ending points, thereby determining the numbers of the long vectors and the short vectors. In addition, the direction of each of the line segments is determined by the data 809 and the data 810, and an angle of the adjacent line segments is given for each pair of the adjacent line segments, thereby determining the numbers of acute angles, obtuse angles, right angles, and pairs of the parallel lines.

Then, data of the numbers of the long vectors, the short vectors, the acute angles, the obtuse angles, the right angles, and the pairs of the parallel lines are compared with the data 1003a of the shapes of the symbols in the symbol recognizing rule 1000a. When it is found as a result of comparison that the symbol 704 for the character string "ORDER PROCESSING" agrees with the shape of the symbol under the column 1003a corresponding to the row "PROCESS" under column 1001a indicative of the kind of the symbol, then the symbol 704 is recognized as the kind of the symbol under the column 1001a "PROCESS".

Thereafter, it is decided to determine if the data 806 indicative of branched points exists in the data of the vector relating to the symbol as the object of recognition contained in graphics table 802. When it is decided that the data 806 exists, the data of vector corresponding to the data 806 is read from graphics table 802, and the data is recognized as the candidate for the connecting line.

Then, it is decided to determine if the candidate for the connecting line includes additional data indicative of branched points. If the candidate for the connecting line has such additional data, the data of vector corresponding to the additional data is read from the graphics table 802, and set up as the partner symbol which is the next object of recognition. The partner symbol is also recognized on the basis of the symbol recognition rule 1000a, and the data 1012a indicative of the position of the arrow and the data 1013a indicative of the shapes of the flow in the flow recognizing rule 1010a are matched with the data of the vector corresponding to the candidate for the connecting line, and the candidate for the connecting line is recognized and decided as the connecting line.

Then, the logic of the relationship of connection of the symbol as the object of recognition with the partner symbol is investigated on the basis of the relationship recognizing rule 1020a for recognizing the relationship of connection between the symbols.

Thereafter, at step 360, a character string corresponding to the symbol 704 is detected, and the relationship of correspondence is stored in a column "ID OF CORRES. CHARACTER STRING", as indicated by reference numeral 904, in a symbols table 900 prepared in the intermediately recognized data storing section 26, as shown in FIGS. 12 and 13.

The intermediately recognized data storing section 26 comprises the symbols table 900, a flow table 910, a character string table 920, a vector data storing section 930, and a stack 940.

Figure 12A:
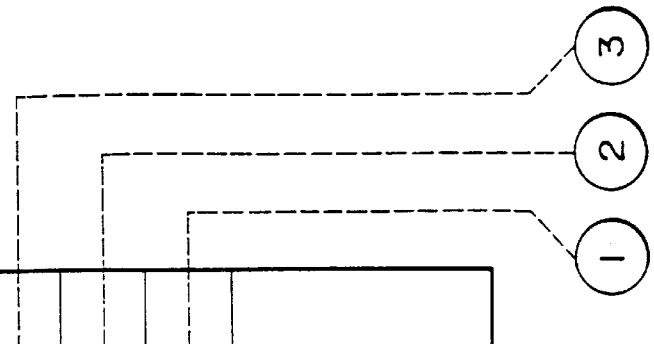
FIGS. 12($a$) and 12($b$) are a table showing a portion of data indicating the intermediate result of recognition.

As shown in FIG. 12, the symbols table 910 may contain data of the identification of symbols under column 901 indicated by "SYMBOL ID", which is represented, for example, by 'S1', 'S2', and the like; data of the kind of the symbols under column 902 indicated by "KIND OF SYMBOLS", which is represented, for example, by 'EXTERNAL AGENT', 'PROCESS' and the like; data of the appropriateness or inappropriateness of the result of recognition of the symbol under column 903 indicated by "DECISION OF RECOGNITION", which is represented, for example, by 'OK' or 'NG'; data of the identification of corresponding character string under column 904 indicated by "ID OF CORRES. CHARACTER STRING"; and data of the vector corresponding to the connected line determined as the object of recognition, under column 905 indicated by "CORRES. VECTOR DATA".

FIG. 12 further shows the flow table 910 which may contain data of the identification of flow under column 911 indicated by "FLOW ID", which is represented, for example, by 'f1', 'f2', and the like; data of the direction of the flow under column 912 indicated by "DIRECTION OF FLOW", which is represented by 'SINGLE' for a single direction, 'BOTH' for both directions, or 'NONE' for no direction; data of the identification of input symbols showing the input symbols under column 913 indicated by "INPUT SYMBOL ID"; data of the identification of output symbols showing the output symbol under column 914 indicated by "OUTPUT SYMBOL ID"; data of the results of recognition of the flow under column 915 indicated by "DECISION OF RECOGNITION"; data of the relationship of connection between the symbols connected through the connected line, under column 916 indicated by "DECISION OF CONNECTION"; data of the identification of the corresponding character string provided on the connected line, under column 917 indicated by "ID OF CORRES. CHARACTER STRING"; and data of the vector corresponding to the connected line determined as the object of recognition, under column 918 indicated by "CORRES. VECTOR DATA".

As shown in FIG. 13, the character string table 920 may contain a column 921 indicative of data of the identification of character strings; a column 922 indicative of data of the results of recognition of the character strings; a column 923 indicative of data of codes of the characters of the recognized character string; and a column 924 indicative of the data of the vector corresponding to the character string determined as the object of recognition.

FIG. 13 further shows the vector data storing section 930 which is so adapted as to correspond the data of the vector prior to recognition to the symbols, flows and character strings subsequent to recognition. Data of each of the symbols, flows and character strings subsequent to recognition are stored in substantially the same type as in the graphics table 802 and the line segments table 807 as shown in FIG. 6.

In addition, as shown in FIG. 13, the stack 940 is so adapted as to store data 941 indicative of the identification of partner symbols for the symbols as the object of recognition. The example as shown in FIG. 13 indicates that partner symbols "ORDER PROCESSING" and "SHIPMENT PROCESSING", whose identification is S2 and S3, respectively, are temporarily stored during the course of the processing for the symbol "USER" as the object of recognition, whose identification is S1.

Turning back to FIG. 10, the relationship of correspondence of the character string corresponding to the symbol as the object of recognition is stored at step 360 under the column 904 indicative of the identification of the corresponding character string of the symbol table 900 and then, at step 370, the character string corresponding to the connected line is detected on the basis of the vector data 809 and 810 indicative of the coordinates of the starting point and the ending point, respectively, of the connected line recognized, and the data 1014a indicative of the position of the character string in the recognizing rule, and this relationship of correspondence is stored in the flows table 910 of FIG. 12 as data 917 indicative of the identification of the corresponding character string. Thereafter, at step 380, the corresponding character string is recognized by a character recognizing technique which has been conventionally utilized for an optical character reader (OCR) or so on, the suitability or unsuitability of the result of recognition is stored in the character string table 920 of FIG. 13 as data 922 for judging the result of recognition, and, when it is found that the result of recognition is suitable, the code of the character is stored in the character string table 920 as character code data 923. It is to be noted herein that steps 360 and 370 are exchangeable.

In FIGS. 12 and 13, reference numerals (1) to (5), inclusive, are intended to mean the relationship of correspondence between the data connected through the broken lines indicated by the respective reference numerals (1) to (5).

A description will now be made of a detail of the processing at step 350 of FIG. 10 with reference to the flowchart as shown in FIG. 11.

At step 351a, the data of the vector of the symbol as the object of recognition, to be delivered as an argument, is matched with the data 1003a indicative of the shape of the symbol, defined in the symbols recognizing rule 1000a, and the symbol identification data 901, the data 902 indicative of the kind of the symbol, the data 903 indicative of the decision of the result of recognition, and the data 905 indicative of the corresponding data of the vector are stored in the symbols table 900 of the intermediately recognized data storing section 26.

Then, at step 352a, it is decided to determine if the data 806 indicative of branched points exists in the data of the vector relating to the symbol as the object of recognition contained in graphics table 802. When it is decided that the data 806 exists, the data of vector corresponding to the data 806 is read from the graphics table 802, and recognized as the candidate for the connecting line.

Then, at step 353a, it is decided to determine if the candidate for the connecting line has additional data indicative of further branched points. If the candidate for the connecting line has such additional data, the data of vector corresponding to the additional data is read from the graphics table 802, and set up as the partner symbol which is the next object of recognition.

Then, at step 354a, the partner symbol set up at step 353a is recognized in the same manner as step 351a, on the basis of the symbol recognition rule 1000a.

Then, at step 355a, the data 1012a indicative of the position of the arrow and the data 1013a indicative of the shapes of the flow in the flow recognizing rule 1010a are matched with the data of the vector corresponding to the candidate for the connecting line, and the candidate for the connecting line is recognized and decided as the connecting line.

Thus, the decided data, including the data 911 of the identification of the flow, the data 912 of the direction of the flow, the data 913 of the input symbol, the data 914 of the output symbol, the data 915 for deciding the result of recognition, and the vector data 918 corresponding to the connected line, are stored in the flow table 910.

Then, at step 356a, the logic of the relationship of connection of the symbol as the object of recognition with the partner symbol is investigated on the basis of the relationship recognizing rule 1020a for recognizing the relationship of connection between the symbols as shown in FIG. 9, and the result of recognition is stored in the flow table 910 of FIG. 12 as the data 916 for judging the connection. Thereafter, at step 357a, the partner symbol is stored temporarily in the stack 940 of FIG. 13, followed by returning to the processing at step 352a.

It is then investigated to determine if the connecting line connected to the symbol set as the object of recognition further exists, and this processing is repeated until no connecting line exists any more. When it is decided at step 352a that no connected line exists any more, on the other hand, then the program flow goes to step 358a at which it is determined if the stack 940 is empty. If even one datum of the kind of symbol is still left in the stack 940, then one symbol indicated by the data of the kind of the symbol is fetched from the diagram recognizing section 25b, and the symbol is set as a symbol as the new object of recognition in step 359a, then the program flow goes back to step 352a. The processing is allowed to end when the stack 940 becames vacant.

The order of fetching one symbol from the stack 940 may be based on any method, such as a first-in first-out method or a first-in last-out method.

Next, a description will be made of the processing at step 350 in FIG. 10, which employs recursive processing, with reference to the flowchart as shown in FIG. 14.

First, at step 351b, the symbol as the object of recognition delivered as an argument is matched with the symbols recognizing rule 1000a. Then, at step 352b, it is decided to determine if the data 806 indicative of branched points exists in the data of the vector relating to the symbol as the object of recognition contained in graphics table 802. When it is decided that the data 806 exists, the data of vector corresponding to the data 806 is read from the graphics table 802, and recognized as the candidate for the connecting line.

Then, at step 353b, it is decided to determine if the candidate for the connecting line has additional data indicative of further branched points. If the candidate for the connecting line has such additional data, the data of vector corresponding to the additional data is read from graphics table 802, and set up as the partner symbol which is the next object of recognition.

Then, at step 354b, the partner symbol set up at step 353b is recognized as in step 351b, on the basis of the symbol recognition rule 1000a.

Then, at step 355b, the data 1012a indicative of the position of the arrow and the data 1013a indicative of the shapes of the flow in the flow recognizing rule 1010a are matched with the data of the vector corresponding to the candidate for the connecting line, and the candidate for the connecting line is recognized and decided as the connecting line.

Thus, the decided data, including the data 911 of the identification of the flow, the data 912 of the direction of the flow, the data 913 of the input symbol, the data 914 of the output symbol, the data 915 for deciding the result of recognition, and the vector data 918 corresponding to the connected line, are stored in the flow table 910. Thereafter, at step 356b, the logic of the relationship of connection between the symbol as the object of recognition and the partner symbol is investigated on the basis of the relationship recognizing rule 1020a indicative of the relationship of connection between the symbols. Then, at step 357b, the partner symbol is assigned to a symbol as a new object of recognition, and the processing for recognizing the symbol and the flow, as shown in FIG. 14, is called in a recursive manner, followed by the processing at step 352b. When it is found at step 352b that no connecting line to be connected to the symbol as the new object of recognition exists, on the other hand, then this processing is allowed to end.

The data stored in the intermediately recognized data storing section 26 by the processing made in the manner as described hereinabove are read by the correction section 27 for correcting the result of recognition, and it is inspected as to whether the data contain any unrecognizable portion. This inspection is conducted on the basis of the data 903 for judging the recognition in the symbol table 900 as shown in FIG. 12, the data 915 for judging the recognition in the flow table 910 as shown in FIG. 12, and the data 922 for judging the recognition in the character string table 920 as shown in FIG. 13. If the symbol, the flow or the character string is represented by "NG", it is displayed on the image display unit 3, requiring the user to make a necessary input recognizable in a correct way.

When it is found that there is neither symbol nor flow nor character string which is represented by 'NG', the correction section 28 stores the result of correction in the recognized result storing section 28. The result of recognition stored therein is then converted by the recognized result converting section 29 into the logical data, as shown in FIG. 4, which have the data format for the output file 4.

As have been described hereinabove, the diagram recognizing system according to the embodiment of the present invention is configured in such a manner that the diagram recognizing rule for recognizing the diagram as the object of recognition is entered from the image display unit 3 and stored in the recognizing rule storing section 25a; the diagram as the object of recognition is then entered as data of an image from the image input unit 1; the symbol, the connecting line, and the character string, each structuring the diagram entered, as well as the relationship of connection between the symbols, are recognized on the basis of the recognizing rule by the diagram recognizing section 25b; the symbol, the connecting line, the character string, and the relationship of connection between the symbols, are generated as the logical data indicative of the kinds of the symbol and the character string and the relationship of connection between the symbols; and the logical data are converted so as to be generated in such a predetermined text type as being capable of being delivered directly to the CASE tools or the like. Hence, the diagram recognizing system according to the present invention can offer the advantages that it can automatically recognize the diagram formed independently from the CASE tools, that is, the one formed manually or through the drawing software, particularly the one in which the symbols have a directivity in relationship of connection between the symbols, the positions of the symbols are not determined in advance, and each of the users may define the diagram in an arbitrary manner, and that the logic recognized can be delivered to the CASE tools or the like without the aid of any manual operation.

Therefore, the diagram recognizing system according to the present invention enables the operations for entering the diagrams to be reduced in forming the source program through the CASE tools or the like, and the operations for inspecting the adaptability of the diagrams on the basis of the logical contents of the diagram, as well as editing the diagrams, storing them, printing them and converting them into data suitable for the step which follows, to be implemented with ease. Further, the diagram recognizing system according to the present invention offers the extremely useful advantage that it can remarkably improve the efficiency in the operations for automatically forming the source program.

In addition, the recognizing rule is so adapted as to be entered from the image display unit 3, so that each user can define and modify the recognizing rule with great freedom. This offers the advantage that the optimal recognizing rule can be structured for each user.

Further, in recognizing the diagram, the diagram recognizing system according to the present invention is arranged in such a manner that the data of the vector to be determined as a first candidate of the character string are separated; the recognition is allowed to start by setting an aggregate of the data of the vector that has the highest possibility of becoming the symbol as a first symbol; the processing is implemented one after another for choosing the open graphic being connected to the first symbol as the candidate for the connecting line, and recognizing a graphic, which exists on the side opposite to the candidate for the connecting line to be connected to the first symbol, as a symbol, and deciding said candidate for the connecting line as the connecting line. Then, each of the symbols is recognized so as to correspond to a candidate of the character string provided on the connected line. Hence, the present invention presents the advantage that error in recognition can be reduced and high recognition performance can be achieved, as compared with the instance where the symbol and the connecting line are recognized with the character string mixed up therewith.

Furthermore, since the unrecognizable portion of the result of recognition can be corrected through the image display unit 3, recognition performance can be improved to a higher extent, and reliability upon the logical data to be generated into the output file 4 can also be improved.

In addition, the data of the image of the diagram to be entered from the image input unit 1 are converted into the data of the vector by the data converting section 23, and the diagram is recognized on the basis of the data of the vector, so that a memory capacity of the storing section for storing the image of the diagram can be made smaller and the processing time can be shortened, as compared with the recognition of the image in a pixel unit.

It is furthermore to be noted herein that, although the recognizing rule for recognizing the diagram is arranged to be entered through the image display unit 3, it can also be entered through the diagram input means. More specifically, as indicated by the broken line 10 in FIG. 1, the diagram may be entered from the image input unit 1 into the recognizing rule storing section 25a and the recognition of the diagram may be implemented in accordance with pattern matching techniques known to the art. Alternatively, the data of the image of the recognizing rule may be recognized by the diagram recognizing section 25b, the result of recognition may be stored as a recognizing rule, and the diagram may then be recognized with substantially the same operations as described hereinabove. In this case, however, it is required to set another recognizing rule for recognizing the data of the image for the recognizing rule.

As shown in FIG. 15, which is a block diagram showing a diagram recognizing system according to the second embodiment of the present invention, the diagram recognizing system may be structured in such a manner that the diagram and the recognizing rule are entered from an input device 11 so arranged as to allow the drawing or the like to be entered through a pen as data of an image that is capable of being generated in a vector representation. This arrangement offers the advantages that the structure becomes simpler than the arrangement in the first embodiment of the present invention because neither the image data storing section 22 nor the data converting section 23 are required.

Figure 16:
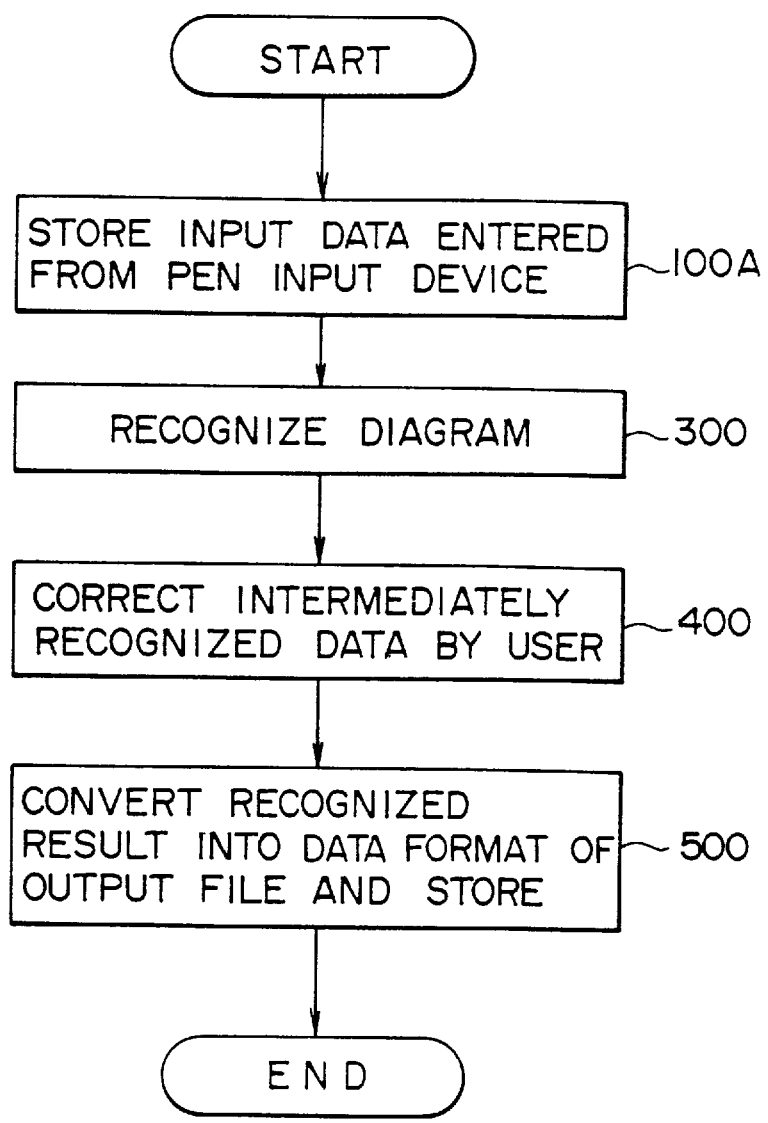
FIG. 16 is a flowchart showing a procedure of processing by the data processing system of FIG. 15.

Further, the steps for the processing for recognition can be reduced to those as shown in FIG. 16.

It is to be noted herein that, as shown in FIG. 16, step 100A denotes the processing for storing the data of the image of the pen input device 11 in the vector data storing section 24; however, the processing at steps 300, 400, and 500 are substantially the same as the corresponding steps as shown in FIG. 2. Hence, a description of the same steps will be omitted from the description that follows.

Figure 19:
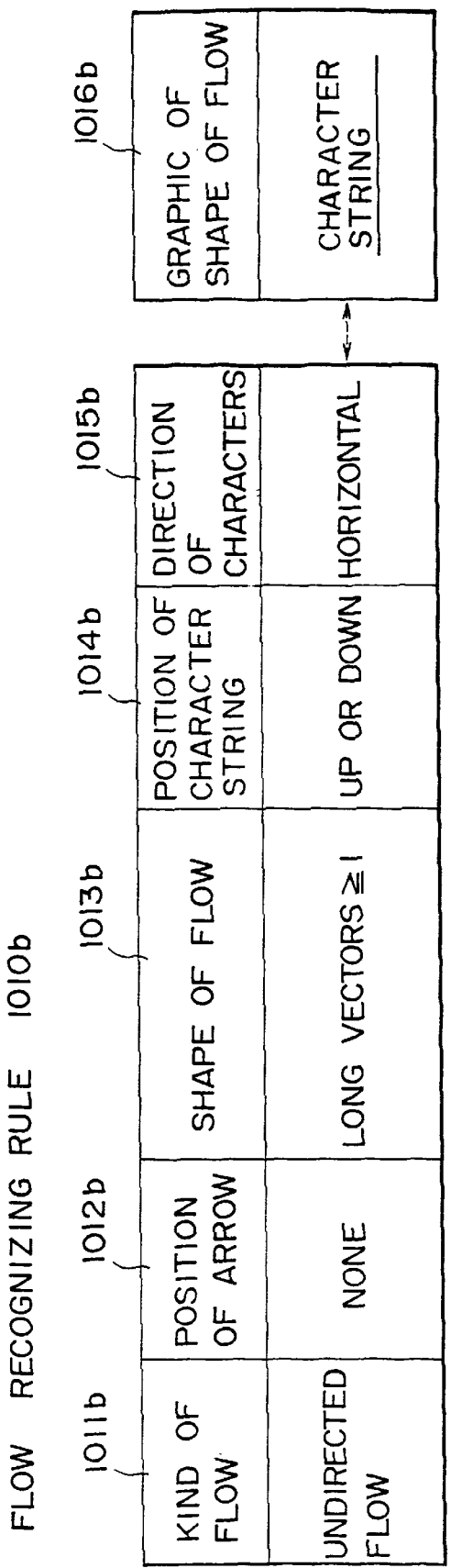
FIG. 19 is a table for describing another example of the definition of the recognizing rule for recognizing the relationship of connection among the symbols.

In addition, the entity relationship diagram can be recognized when the recognizing rule is defined in the manner as shown in FIGS. 17 to 19, inclusive, although those as shown in FIGS. 7 to 9, inclusive, are demonstrated as examples of the recognizing rules.

It can be noted herein that the recognizing rules as shown in FIGS. 17, 18 and 19 are different from those as shown in FIGS. 7, 8 and 9, respectively, in that the recognizing rules are so arranged as to define a composite symbol, as indicated by reference numeral 1006b, as the kind of the symbol, as indicated by "WEAK ENTITY" and a connecting line with no indication of an arrow, as indicated by reference numeral 1016b. It is further to be noted that the reference symbols of the data in FIGS. 17, 18 and 19 are provided with a suffix b in place of the suffix a of the reference symbols of the data in FIGS. 7, 8 and 9; however, the subject to be defined is the same.

It is further to be noted that, for example, even if the user intends to draw a long line as a diagram, it may be recognized as an aggregate of shorter lines when it is converted into data of a vector due to an error or for other reasons. For instance, when a long line is drawn manually in such a manner as being curved to a slight extent, the situation as described hereinabove may happen. In this case, however, a technique for matching the symbol with a recognizing rule using an evaluation point with such an error taken into account may be utilized in order to improve the rate of recognition. This technique may be carried out in the processing for matching the symbol with the recognizing rule at steps 351a and 354a in FIG. 11 and at steps 351b and 354b in FIG. 14.

FIG. 20 shows an example of a table 2010 for calculating evaluation points for the symbol recognizing rule 2000. The symbol recognizing rule 2000 contains a column entitled "KIND OF SYMBOL", containing items such as "external agent", "process", and "file"; a column entitled "CLASSIFICATION", containing items such as "Simple"; a column entitled "SHAPE OF SYMBOL", containing, for example, items such as "the number of long vectors", "a minimum of the number of short vectors", "the number of acute angles", "the number of right angles", "the number of obtuse angles", "the total number of angles", and "the number of pairs of parallel lines"; a column entitled "POSITION OF CHARACTER STRING", containing, for example, items such as "inside"; a column entitled "DIRECTION OF CHARACTERS", containing, for example, items such as "horizontal"; and a column entitled "CLASS OF GRAPHIC", containing, for example, items such as "closed graphic" or "open graphic". The table 2010 for calculating the evaluation points contains a column 2011 entitled "RECOGNIZING RULES", containing to, for example, items such as the number of long vectors, a minimum of the number of short vectors, the number of acute angles, the number of right angles, the number of obtuse angles, the total number of angles, and the number of pairs of parallel lines; a column 2012 entitled "SCORES WHEN VALUE OF RECOGNIZING RULE AGREES", and a column 2013 entitled "SCORES TO BE DEDUCTED WHEN RECOGNIZING RULE VARIES BY ONE". In other words, the column 2012 of the table 2010 indicates the score for each item of the recognizing rule 2011, when the value of the shape of the symbol, as indicated by the column 2001 of the recognizing rule 2000, agrees with a value obtained by quantifying the shape of the graphic. The column 2013 indicates the score for each of the items of the recognizing rule 2011, to be deducted when the value of the recognizing rule varies by one from the value obtained by quantifying the shape of the graphic.

FIG. 21 indicates the result of evaluation, as indicated by reference numeral 2110, obtained on the basis of the table 2010 of FIG. 20, for the shape of the graphic as indicated by reference numeral 2100 in FIG. 21. A column 2113 entitled "QUANTIFICATION OF GRAPHIC SHAPE" indicates the result of a column 2111 entitled "RECOGNIZING RULE", which is applied to the shape of the graphic as indicated by reference numeral 2100. In other words, the value 2113 of the quantification of the graphic shape 2100 is such that the number of the long vectors of the recognizing rule 2111 is five; the number of acute angles is two; the number of obtuse angles is three; the total number of angles is five; and the rest of the items of the recognizing rule are each zero.

A column 2114 entitled "EXTERNAL AGENT" contains a sub-column 2115 entitled "DIFFERENCE" and a sub-column 2116 entitled "EVALUATION POINT". The item "DIFFERENCE" of the sub-column 2115 is a difference between the item 2001, indicative of the shape of the symbol of the symbol recognizing rule 2000 and the quantification 2113 of the shape of the graphic. Accordingly, for example, the number of obtuse angles in the item 2002 in the symbol shape 2001 of the symbol recognizing rule 2000 in FIG. 20 is defined so as to range from zero to two and the quantification 2113 of the graphic shape indicates the number of obtuse angles being three, so that the difference as defined in the sub-column 2114 is one. Hence, the column 2116 "EVALUATION POINT" gives an evaluation point by subtracting the score in the column 2013 from the column 2012. In other words, when the difference 2114 of the number of obtuse angles is determined as one, as described hereinabove, the evaluation point in the column 2116 of FIG. 21 for the item "number of obtuse angles" in the column 2111 is '20' determined by subtracting the score of '10', (given by multiplying the score of '10' in the column 2013 by '1' as the value of the difference in the column 2114), from the score of '30' in the column 2012. Hence, the formula in this case may be represented as follows: 30–(10× 1)=20.

In the table for the evaluation result, as indicated by reference numeral 2110 in FIG. 21, a column entitled "PROCESS" contains a sub-column entitled "DIFFERENCE" and a sub-column entitled "EVALUATION POINT", while a column entitled "FILE" also contains a sub-column entitled "DIFFERENCE" and a sub-column entitled "EVALUATION POINT". The evaluation points for the column "PROCESS" and for the column "FILE" can be calculated in the same manner as described hereinabove.

As a result, the highest score in the item "TOTAL OF EVALUATION POINT", as indicated by reference numeral 2117 in FIG. 21, is determined as the result of recognition for the graphic shape 2100. Hence, in this case, the evaluation point of '270' for the external agent is given as the result of recognition for the graphic shape 2100. It can be noted herein that the table 2010 for calculating the evaluation points can give values at improved recognition rates by preparing statistics of examples of actual inputs and setting the values.

As have been described hereinabove, the diagram recognizing system according to the present invention is configured in such a manner that the recognizing rule for recognizing the diagram as the object of recognition is entered; the recognizing rule is stored in the recognizing rule storing means; the diagram as the object of recognition is entered as the data of the image; the symbols, the connecting lines, the character string, and the relationship of connection between the symbols, each structuring the entered diagram, are recognized by the diagram recognizing means on the basis of the recognizing rule; the kind of each of the symbols, the kind of character string, and the relationship of connection between the symbols are generated as logical data; and the logical data are converted into such a predetermined file type that is capable of being delivered directly to the CASE tools or the like and generated in such a file format. Hence, the diagram recognizing system according to the present invention can offer the advantages that it can automatically recognize the diagram that is formed, for example, by manual drawing or through drawing software, in a fashion independent from the CASE tool, particularly the one that has a directivity in the relationship of connection between the symbols, that is not predetermined in terms of its position, and that is defined in an arbitrary manner by each user; and that the logic recognized can be delivered to the CASE tool or the like without the aid of a manual operation.

In addition, by adopting the evaluation points for recognizing the shape of the symbol, the diagram recognizing system according to the present invention can further improve recognition rates by adjusting the evaluation points for input data containing an error in manually writing or for other reasons so as to be adapted to the kind of drawing or writing device used for drawing the diagram, the width of lines, the quality of paper, the writing habit of an individual writer, or the like.

Hence, the diagram recognizing system according to the present invention can reduce the operations for entering the diagrams upon the formation of a source program through the CASE tool or the like and readily implement the processing for investigating the adaptability on the basis of the logical contents of the diagrams and for editing the diagrams, storing them, printing them, and converting them to data processible in the steps which follow, thereby offering the extremely useful result that it can improve efficiency in the operations for automatically preparing the source program.

Furthermore, the diagram recognizing system according to the present invention presents the effect that the optimal recognizing rule can be structured for each user because the recognizing rule can be defined and altered by each user with high freedom.

The present invention is not intended in any manner to be limited to the embodiments as described hereinabove, and it is to be understood that any variations or modifications made so as not to deviate from the basic concepts of the present invention are interpreted as being contained within the spirit of the present invention.

What is claimed is:

1. A diagram recognizing system, comprising:
   diagram input means for entering a diagram as image data, said diagram including at least two symbols represented by geometric graphics, a connecting line having a direction indicating the logical relationship between the two symbols, and a character string provided on one of the symbols and the connecting line, said diagram being employed for describing a specification for data processing;

data converting means for converting the image data of the diagram entered from said diagram input means into vector data and classifying said vector data into one of a group of open graphics and a group of closed graphics;

a symbol recognizing rule including a kind of symbol, a classification of symbol, a shape of symbol, an item indicative of a feature of the shape of symbol as well as a position and a direction of the character string to be provided for a symbol;

a flow recognizing rule which describes a position of an arrow mark, a shape of a flow, an item indicative of a feature of the shape of a flow as well as a position and a direction of the character string to be provided for a flow;

a relationship recognizing rule which describes an acceptable logical connection relationship between symbols; and diagram recognizing means for separating vector data having a length equal to or shorter than a predetermined length from said classified graphics as a candidate for the character string; for choosing a first one of the group of closed graphics for recognizing a first symbol as corresponding to said chosen first closed graphic based on said symbol recognizing rule; for choosing one of said group of open graphics as a candidate for the connecting line connected to said first symbol; for choosing a second one of the closed graphics for recognizing a second symbol as corresponding to said chosen second closed graphic; for recognizing said candidate for the connecting line as a connecting line based on said flow recognizing rule; for recognizing an acceptable logical relationship between said recognized first and second symbols based on said relationship recognizing rule when said relationship recognizing rule is satisfied by said recognized first and second symbols; for corresponding the separated candidate for the character string to each of the recognized first and second symbols or to the connecting line based on said recognizing rules; for converting the candidate for the character string into a character string; and for generating the recognized first and second symbols, connecting line, and logical relationship between the recognized first and second symbols corresponded by the connecting line and the character string corresponded to one of the recognized first and second symbols or the connecting line, as recognition result data;

wherein said diagram recognizing means includes determination processing means for determining whether each chosen graphic represents a symbol or a flow, on the basis of an evaluation point of the chosen graphic, said evaluation point being defined by recognizing items of a vector length of a minimum value or a maximum value, an acute angle and an obtuse angle of the chosen graphic, the total number of corners of the chosen graphic, and the number of pairs of parallel lines of the chosen graphic, with respect to the vector data of the chosen graphic as an object of recognition chosen from the groups of open and closed graphics; by assigning a count of points of agreements and a count of points of differences for each of the items on the basis of the items indicative of the features of the shape of the symbol and the shape of the flow, to thereby determine the total number of counts; and by rating the total number thereof as the evaluation point.

* * * * *